US012704015B2

(12) United States Patent
Higuchi et al.

(10) Patent No.: US 12,704,015 B2
(45) Date of Patent: Aug. 11, 2026

(54) MEDIUM TRANSPORT DEVICE AND RECORDING DEVICE

(71) Applicant: SEIKO EPSON CORPORATION, Tokyo (JP)

(72) Inventors: Yusuke Higuchi, Matsumoto (JP); Yohei Sakai, Matsumoto (JP); Kazutoshi Matsuzaki, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 183 days.

(21) Appl. No.: 18/802,236

(22) Filed: Aug. 13, 2024

(65) Prior Publication Data

US 2025/0059814 A1 Feb. 20, 2025

(30) Foreign Application Priority Data

Aug. 17, 2023 (JP) ................................ 2023-133072

(51) Int. Cl.
*E05F 1/08* (2006.01)
*B41J 29/13* (2006.01)

(52) U.S. Cl.
CPC ................ *E05F 1/08* (2013.01); *B41J 29/13* (2013.01); *E05Y 2900/132* (2013.01)

(58) Field of Classification Search
CPC ........ E05F 1/08; B41J 29/13; E05Y 2900/132
See application file for complete search history.

(56) References Cited

U.S. PATENT DOCUMENTS 7,370,792 B1 * 5/2008 Graef ...................... G07F 19/20 235/379
9,803,405 B2 * 10/2017 Zetti ..................... E05D 7/0407
2011/0146654 A1 * 6/2011 Basavalingappa Mudbasal .......... E05F 3/20 16/222
2011/0146655 A1 * 6/2011 Basavalingappa Mudbasal .......... E05F 3/20 126/194
2011/0148262 A1 * 6/2011 Basavalingappa Mudbasal .......... E05F 1/1261 312/319.2
2015/0261166 A1 * 9/2015 Takahashi .......... G03G 21/1633 271/3.2
2022/0234857 A1 7/2022 Yamada (Continued)

FOREIGN PATENT DOCUMENTS

JP H05-057274 U 7/1993
JP H06-153334 A 5/1994
JP H09-278197 A 10/1997

(Continued)

*Primary Examiner* — David H Banh
(74) *Attorney, Agent, or Firm* — WORKMAN NYDEGGER

(57) ABSTRACT

A medium transport device includes a device main bod, a door section configured to open and close with respect to the device main body around a pivot shaft, and a door holding section configured to hold a state in which the door section is opened at a predetermined angle or more with respect to the device main body. The door section is configured to form at least a part of the transport path. The door holding section includes a spring provided on the door section or the device main body and an engagement section is provided on the other. The spring includes a section which is positioned between a fixed end and a free end, and the section applies a spring force to the engagement section to hold the door section in a state of being opened at the predetermined angle or more.

16 Claims, 19 Drawing Sheets

(56) References Cited

U.S. PATENT DOCUMENTS

| | | | | |
|---|---|---|---|---|
| 2023/0120301 | A1 | 4/2023 | Yamada et al. | |
| 2023/0257222 | A1* | 8/2023 | Hanaoka ................ | B65H 5/062 |

FOREIGN PATENT DOCUMENTS

| | | | |
|---|---|---|---|
| JP | H10-019035 | | 1/1998 |
| JP | 2007-304457 | A | 11/2007 |
| JP | 2011-099248 | A | 5/2011 |
| JP | 2019-041447 | A | 3/2019 |
| JP | 2023-061036 | A | 5/2023 |

* cited by examiner

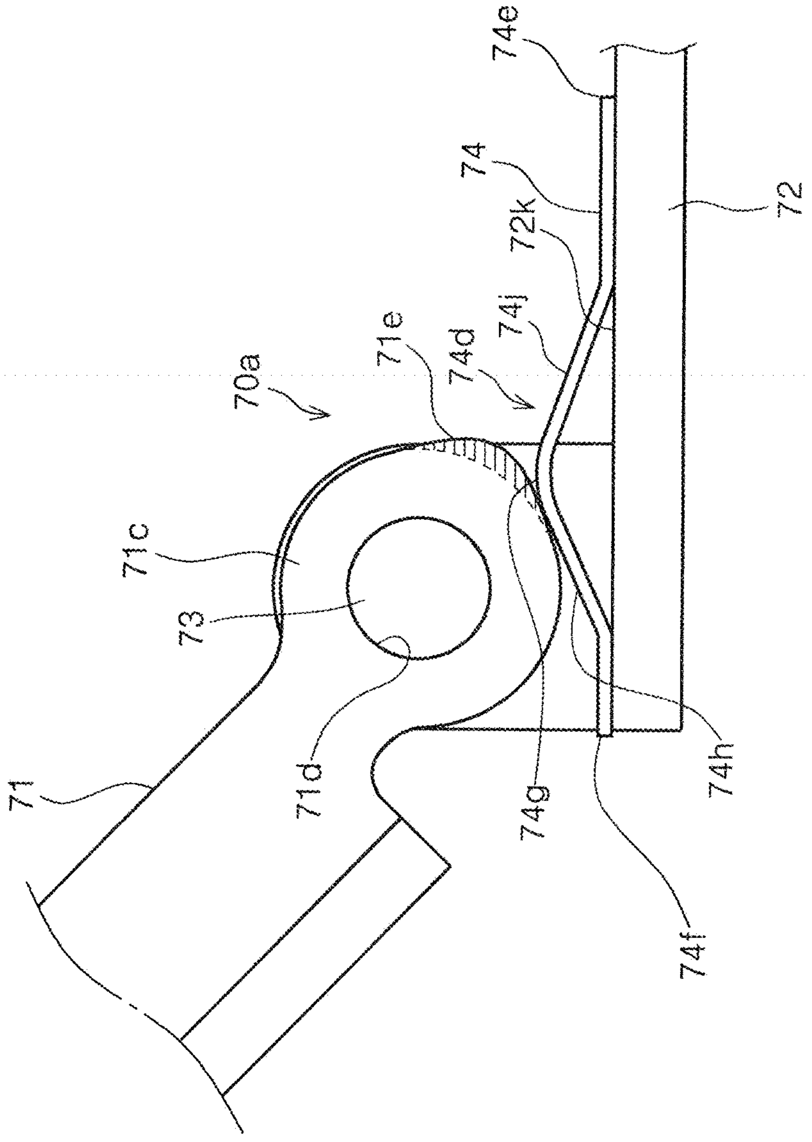
FIG. 15
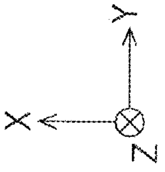

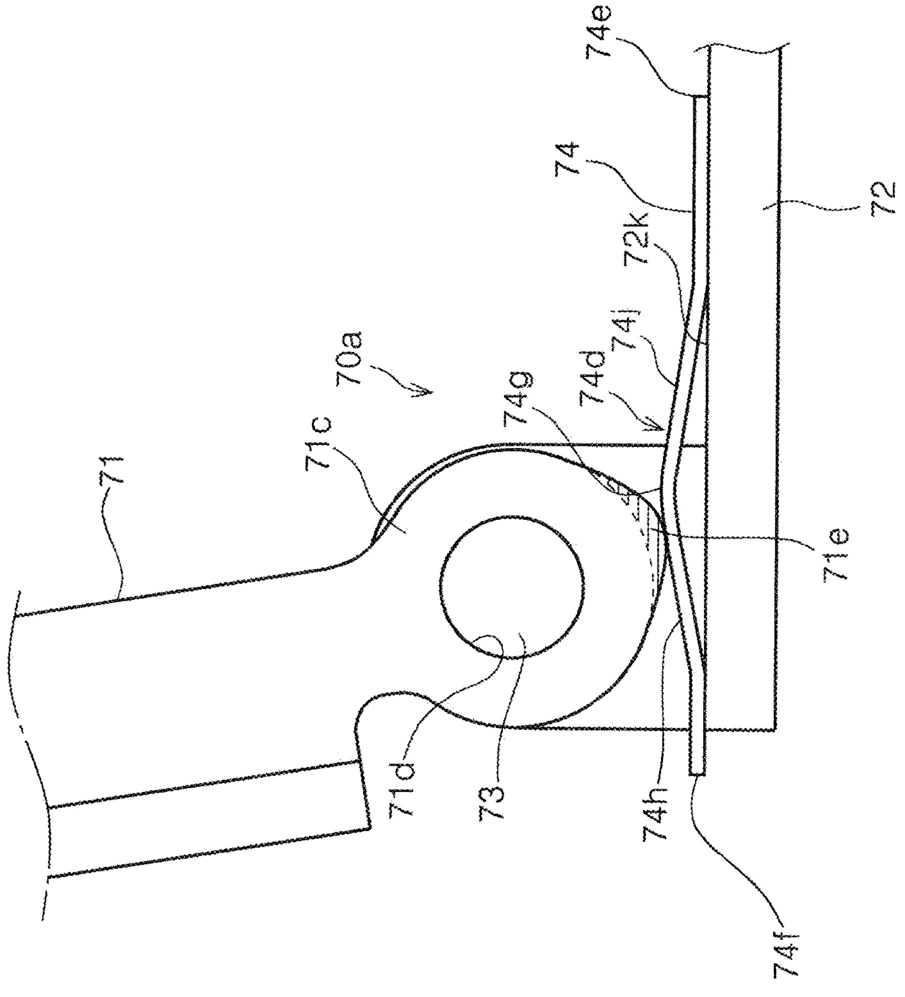
FIG. 16
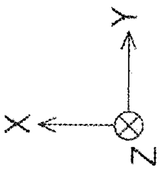

MEDIUM TRANSPORT DEVICE AND RECORDING DEVICE

The present application is based on, and claims priority from JP Application Serial Number 2023-133072, filed Aug. 17, 2023, the disclosure of which is hereby incorporated by reference herein in its entirety.

BACKGROUND

1. Technical Field

The present disclosure relates to a medium transport device for transporting a medium and a recording device that includes the medium transport device.

2. Related Art

A medium transport device for transporting a medium may be provided with a door for opening a medium transport path, as shown in JP-A-2023-061036. The door is attached to a device main body via a hinge.

The door may include a structure for holding an open state as shown in a JP-A-6-153334. The door device described in JP-A-6-153334 is provided with a locking protrusion provided on the door, and a locking spring formed by a substantially U-shaped leaf spring and formed by bending a protruding section over which the locking protrusion passes when one part of the leaf spring opens the door.

Since the locking spring shown in JP-A-6-153334 is formed by the substantially U-shaped leaf spring, a large space around a shaft is required, and the device becomes larger.

Although the protruding section formed on the locking spring is formed at a free end of the leaf spring, since the free end is provided in a free state in a direction of advancing and retracting with respect to the locking protrusion, a position of the protruding section with respect to the locking protrusion is unlikely to be stable. When the protruding section is separated from the locking protrusion, a holding force for holding the door in an open state is insufficient. On the other hand, if the protruding section approaches the locking protrusion, a large operating force may be required to close the door, or an excessive force may be applied to the leaf spring to plastically deform the leaf spring. Therefore, it is desired to appropriately obtain a holding force for holding the door in an open state.

SUMMARY

In order to overcome the above-described problem, a medium transport device according to the present disclosure is a medium transport device that includes a transport path for transporting a medium, the medium transport device including a device main body; a door section configured to open and close with respect to the device main body around a pivot shaft extending in a vertical direction; and a door holding section configured to hold a state in which the door section is opened at a predetermined angle or more with respect to the device main body, wherein the door section is configured to form at least a part of the transport path, the door holding section includes a plate-like leaf spring provided on one of the door section and the device main body, and an engagement section provided on the other of the door section and the device main body, the leaf spring includes a fixed end which is one end section and is attached to one of the door section and the device main body, a free end which is the other end section and is configured to slide with respect to one of the door section and the device main body, and a protruding section which is positioned between the fixed end and the free end, and the protruding section applies a spring force to the engagement section to hold the door section in a state of being opened at the predetermined angle or more.

A recording device according to the present disclosure includes the above-described medium transport device and a recording section that is accommodated in the device main body and that performs recording on a medium transported in the transport path.

BRIEF DESCRIPTION OF THE DRAWINGS

FIG. 15 is a view of a main part of the hinge section in a state where the door section is opened, as viewed from the −Z direction.

FIG. 16 is a view of a main part of the hinge section in a state where the door section is opened, as viewed from the −Z direction.

DESCRIPTION OF EMBODIMENTS

Figure 1:
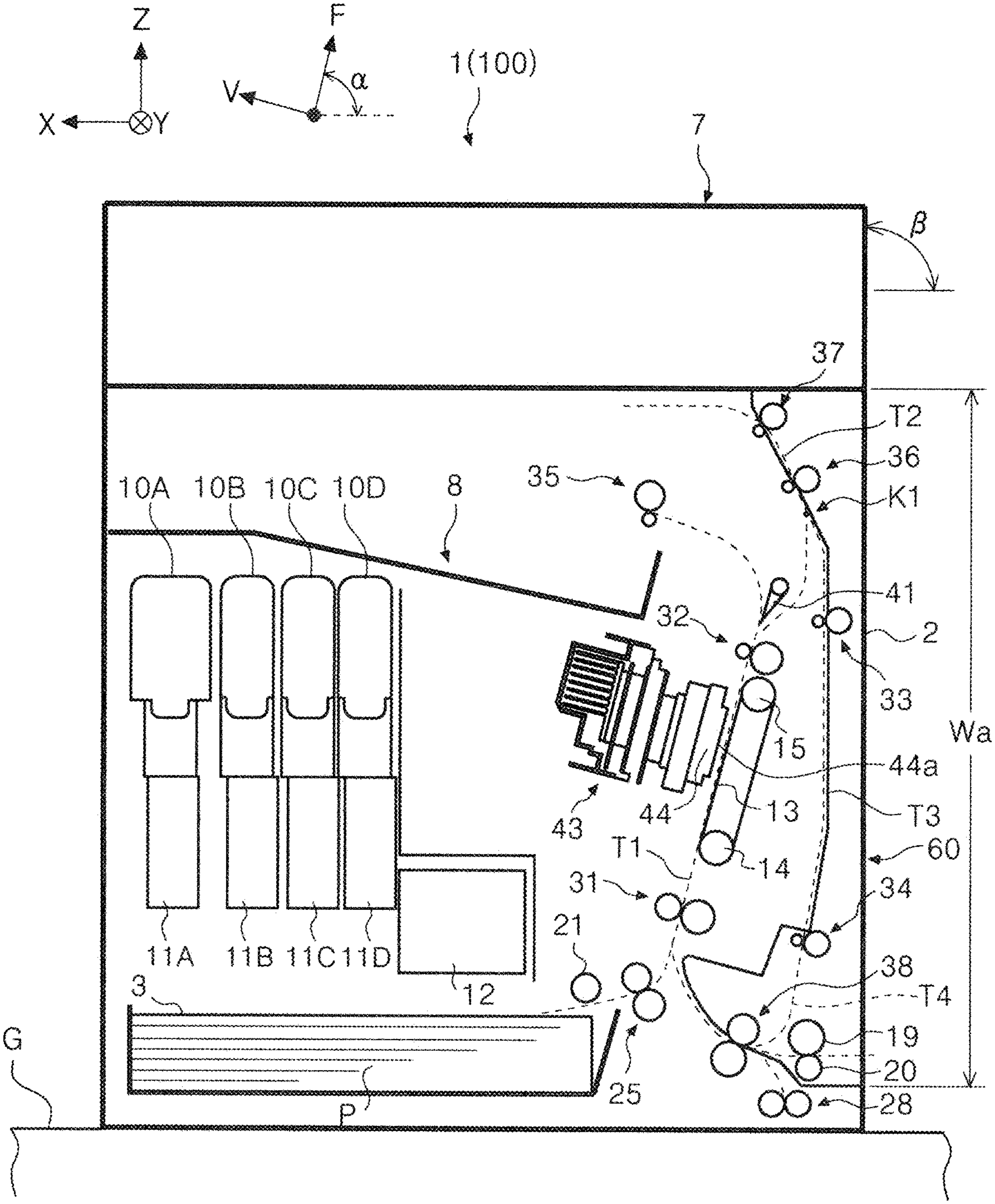
FIG. 1 is a diagram showing a medium transport path of a printer.

Hereinafter, the present disclosure will be schematically described.

A medium transport device according to a first aspect is a medium transport device that includes a transport path for transporting a medium, the medium transport device including a device main body; a door section configured to open and close with respect to the device main body around a pivot shaft extending in a vertical direction; and a door holding section configured to hold a state in which the door section is opened at a predetermined angle or more with respect to the device main body, wherein the door section is configured to form at least a part of the transport path, the door holding section includes a plate-like leaf spring provided on one of the door section and the device main body, and an engagement section provided on the other of the door section and the device main body, the leaf spring includes a fixed end which is one end section and is attached to one of the door section and the device main body, a free end which is the other end section and is configured to slide with respect to one of the door section and the device main body, and a protruding section which is positioned between the fixed end and the free end, and the protruding section applies a spring force to the engagement section to hold the door section in a state of being opened at the predetermined angle or more.

According to the present aspect, by opening the door section, it is possible to release a jam at least in the transport path corresponding to the door section. At this time, since an opened state of the door section can be maintained by the door holding section, access to the device main body at the time of jam processing work or the like becomes easy.

Further, since the leaf spring is a plate-like member including the free end and the fixed end, it is possible to suppress the space required for installation of a member for holding the door section in an open state, thus it is possible to suppress increases in the size of the device.

The leaf spring is provided with a free end and, by using a configuration that slides the free end with respect to one of the door section and the device main body, the position of the protruding section with respect to the engagement section is more likely to be stable. As a result, it is possible to appropriately obtain a holding force for holding the door section in an open state.

A second aspect is an aspect according to the first aspect, and the door section includes a door main body and a door side hinge, the device main body includes an attachment frame and a main body side hinge, the leaf spring is provided on one of the door side hinge and the main body side hinge, and the engagement section is provided on the other of the door side hinge and the main body side hinge.

According to the present aspect, in a configuration including the door side hinge and the main body side hinge, the operation and effect of the first aspect described above are obtained.

A third aspect is an aspect according to the second aspect, and the leaf spring is fixed to one of the door side hinge and the main body side hinge by a screw that fixes one of the door side hinge and the main body side hinge.

According to the present aspect, since the leaf spring is configured to be fixed to one of the door side hinge and the main body side hinge by the screw that fixes one of the door side hinge and the main body side hinge, an exclusive step for fixing the leaf spring is not necessary, and thus it is possible to improve workability and to contribute to cost reduction.

A fourth aspect is an aspect according to the second aspect, and one of the door side hinge and the main body side hinge includes a spring holding section for provisionally fixing the leaf spring at a fixed position with respect to one of the door side hinge and the main body side hinge.

According to the present aspect, since one of the door side hinge and the main body side hinge includes the spring holding section for provisionally fixing the leaf spring at the fixed position with respect to one of the door side hinge and the main body side hinge, workability when fixing the leaf spring to one of the door side hinge and the main body side hinge is improved.

The present aspect is not limited to the second aspect, and may be according to the third aspect.

A fifth aspect is an aspect according to the second aspect, and the protruding section is arranged between the pivot shaft and one of the door side hinge and the main body side hinge.

According to the present aspect, since the protruding section is arranged by using a space between the pivot shaft and one of the door side hinge and the main body side hinge, it is possible to reduce the size of the device.

The present aspect is not limited to the second aspect and may be according to the third or fourth aspect.

A sixth aspect is an aspect according to the second aspect, and the leaf spring is provided on the main body side hinge and the engagement section is provided on the door side hinge.

Since the fixed end and the free end of the leaf spring are supported, if a portion for supporting the leaf spring were provided on a rotating side, that is, on the door section, the rotating side, that is, the door section, would tend to increase in size. However, according to the present aspect, since the leaf spring is provided on the main body side hinge and the engagement section is provided on the door side hinge, it is possible to suppress an increase in size of the door section.

The present aspect is not limited to the second aspect and may be according to any one of the third to fifth aspects.

A seventh aspect is an aspect according to the sixth aspect, and the door side hinge includes a door side shaft insertion section through which the pivot shaft is inserted and the engagement section is provided on the door side shaft insertion section.

According to the present aspect, since the door side hinge includes the door side shaft insertion section through which the pivot shaft is inserted and the engagement section is provided on the door side shaft insertion section, it is possible to achieve a reduction in the size of the device compared to a configuration in which the engagement section is provided exclusively.

An eighth aspect is an aspect according to the first aspect, and a plurality of the door holding sections is provided along an axial direction of the pivot shaft.

According to the present aspect, since a plurality of the door holding sections is provided along the axial direction of the pivot shaft, it is possible to more reliably hold the door section in an open state.

The present aspect is not limited to the first aspect and may be according to any one of the second to seventh aspects.

A ninth aspect is an aspect according to the second aspect, and the main body side hinge includes a bent section formed by bending in a direction intersecting with a surface on which the leaf spring is provided, the bent section includes a connected section connected to the surface on which the leaf spring is provided and a positioning section extending from the connected section, and the positioning section positions the main body side hinge in the vertical direction.

According to the present aspect, since the positioning section positions the main body side hinge in the vertical direction, the position accuracy in the vertical direction of the main body side hinge is improved, and the assembly work is facilitated.

A portion of the bent section that is bent in a direction intersecting the surface where the leaf spring is provided tends to have less position accuracy due to deformation, so if this portion is used as the positioning section, deviations in the position of the main body side hinge in the vertical direction are more likely to occur. However, according to the present embodiment, since the positioning section is provided at a portion extending from the connected section, it is possible to determine the position in the vertical direction of the main body side hinge more accurately.

The present aspect is not limited to the second aspect and may be according to any one of the third to eighth aspects.

A tenth aspect is an aspect according to the first aspect, and in a state where the door section is opened at the predetermined angle or more, the engagement section is positioned on a free end side with respect to a top section of the protruding section.

In a case of a configuration in which the engagement section is positioned on the free end side with respect to the top section of the protruding section in a state where the door section is opened at the predetermined angle or more, when the door section is opened, deformation of the protruding section can escape to the free end side. As a result, it is possible to suppress a load when opening the door section.

The present aspect is not limited to the first aspect and may be according to any one of the second to ninth aspects.

An eleventh aspect is an aspect according to the first aspect, and the protruding section includes a first inclined surface inclined toward the free end and an angle formed between the first inclined surface and a line orthogonal to a line connecting a center of the pivot shaft and a contact point is smaller than 45°, the contact point being defined as a point at which the engagement section contacts the protruding section by the door section being pivoted, in a closing direction, from a state where the door section is opened at an angle larger than the predetermined angle and the engagement section is not in contact with the protruding section.

When the engagement section passes over the protruding section from the fixed end side to the free end side, the engagement section can easily pass over the protruding section by sliding the free end, but when the engagement section passes over the protruding section from the free end side to the fixed end side, the protruding section tends to deform in a direction opposite to a sliding direction of the free end, that is, toward the fixed end side, so that a large resistance force is generated.

According to the present aspect, since the angle formed between the first inclined surface and a line orthogonal to a line connecting a center of the pivot shaft and the contact point is smaller than 45°, it is possible to suppress the resistance force.

The present aspect is not limited to the first aspect and may be according to any one of the second to tenth aspects.

A twelfth aspect is an aspect according to the first aspect, and the protruding section includes a first inclined surface inclined toward the free end and a second inclined surface inclined toward the fixed end and an inclination angle of the first inclined surface is smaller than an inclination angle of the second inclined surface.

When the engagement section passes over the protruding section from the fixed end side to the free end side, the engagement section can easily pass over the protruding section by sliding the free end, but when the engagement section passes over the protruding section from the free end side to the fixed end side, the protruding section tends to deform in a direction opposite to a sliding direction of the free end, that is, toward the fixed end side, so that a large resistance force is generated.

According to the present aspect, since the inclination angle of the first inclined surface inclined toward the free end is smaller than the inclination angle of the second inclined surface inclined toward the fixed end, it is possible to suppress the resistance force.

The present aspect is not limited to the first aspect and may be according to any one of the second to eleventh aspects.

A thirteenth aspect is an aspect according to the first aspect, and the predetermined angle is 60° or more.

According to the present aspect, since the predetermined angle is 60° or more, it is possible to hold an open state of the door section in a state where the door section secures an opening angle, and it is easy to access the device main body at the time of jam processing work or the like.

The present aspect is not limited to the first aspect and may be according to any one of the second to twelfth aspects.

A fourteenth aspect is an aspect according to the first aspect, and the medium transport device further includes a lock section configured to hold the door section in a closed state with respect to the device main body.

According to the present aspect, since the medium transport device further includes the lock section configured to hold the door section in a closed state with respect to the device main body, it is possible to reliably hold the door section in a closed state.

The present aspect is not limited to the first aspect and may be according to any one of the second to thirteenth aspects.

A recording device according to a fifteenth aspect includes the medium transport device according to any one of the first to fourteenth aspects and a recording section that is accommodated in the device main body and that performs recording on a medium transported in the transport path.

According to the present aspect, in a recording device including a recording section that performs recording on a medium, it is possible to obtain the operation and effect of any one of the first to fourteenth aspects described above.

A sixteenth aspect is an aspect according to the fifteenth aspect, and the recording device further includes a medium accommodation section that is positioned below the recording section and that is configured to accommodate a medium on which recording is performed by the recording section and a medium placement section that is positioned above the recording section and on which a medium on which recording has been performed by the recording section is discharged and supported, wherein the door section, when viewed in a direction perpendicular to the door section, overlaps with the recording section, the medium accommodation section, and the medium placement section.

In a configuration in which the door section, when viewed in the direction perpendicular to the door section, overlaps with the recording section, the medium accommodation section, and the medium placement section, the door section is enlarged, the weight is increased and there is a possibility that an open state is difficult to maintain. However, by the operation and effect of the first aspect, it is possible to properly maintain the state in which the door section is opened.

Hereinafter, the present disclosure will be specifically described.

Hereinafter, an inkjet printer 1 that performs recording by ejecting ink, which is an example of liquid, on a medium represented by a recording sheet, will be described as an example of a recording device. Hereinafter, the inkjet printer 1 will be referred to simply as a printer 1. The printer 1 can also be regarded as a medium transport device 100 from the viewpoint of transporting a medium. In this case, the printer 1 includes the medium transport device 100 and a line head 44, which is an example of a recording section (to be described later).

The X-Y-Z coordinate system shown in each drawing is an orthogonal coordinate system, and a Y-axis direction is a direction intersecting a transport direction of a medium, that is, a medium width direction, and is also a device depth direction. In the Y-axis direction, a +Y direction is a direction from a device front surface toward a device rear surface, and a −Y direction is a direction from the device rear surface toward the device front surface.

An X-axis direction is a device width direction and, as viewed from an operator of the printer 1, a +X direction is a left side and a −X direction is a right side. A Z-axis direction is a vertical direction, and is a normal line direction with respect to a placement surface G of the printer 1, that is, a device height direction. In the Z-axis direction, a +Z direction is an upward direction, and a −Z direction is a downward direction.

Hereinafter, a direction in which a medium is fed may be referred to as “downstream”, and an opposite direction may be referred to as “upstream”. In FIG. 1, a medium transport path is indicated by dashed lines. In the printer 1, a medium is transported through the medium transport path indicated by dashed lines in FIG. 1.

An F-axis direction is a medium transport direction between a line head 44 and a transport belt 13 (to be described later), that is, in a recording region, and a +F direction is downstream in the transport direction and a −F direction opposite thereto is upstream in the transport direction. A V-axis direction is a direction orthogonal to the F-axis direction.

The printer 1 is a multifunction device including a scanner unit 7, which is an example of an image reading device, in an upper portion of a device main body 2. However, the scanner unit 7 may be omitted.

An operation panel 6 for performing various operation settings is provided at an upper portion of the device main body 2. In the printer 1, a side surface in the −Y direction, which is the side on which the operation panel 6 is provided, is referred to as a device front surface.

The printer 1 is configured such that an additional unit (not shown) can be connected to a lower portion of the device main body 2, and a medium can be fed from the additional unit. However, the additional unit does not have to be connectable.

In FIG. 1, reference symbol 28 denotes a transport roller pair for feeding a medium fed from the additional unit (not shown) into the device main body 2.

The device main body 2 includes a first medium cassette 3, which is an example of a medium accommodation section that accommodates a medium at a lower portion.

A pickup roller 21 is provided corresponding to the first medium cassette 3 to send out the accommodated medium in the −X direction. The medium sent out by the pickup roller 21 is sent toward a transport roller pair 31 by a feed roller pair 25.

In the following description, unless otherwise specified, a “roller pair” includes a drive roller that is driven by a drive source (not shown) to apply a feeding force to a medium, and a driven roller that is driven to rotate by contact with the drive roller or a medium.

The medium that receives a feeding force from the transport roller pair 31 is fed to a position between the line head 44, which is an example of a recording head, and the transport belt 13, that is, to a position facing the line head 44. Hereinafter, a medium transport path from the transport roller pair 31 to a transport roller pair 32 is referred to as a recording transport path T1.

The line head 44, which is an example of a recording section, constitutes a head unit 43. The line head 44 executes recording by ejecting ink on a surface of a medium. The line head 44 is an ink ejection head configured such that nozzles ejecting ink cover the entire area in the medium width direction, and is configured as an ink ejection head capable of recording on the entire area in the medium width direction without being moved in the medium width direction. However, an ink ejection head is not limited to this, and may be of a type that is mounted on a carriage and that ejects ink while moving in the medium width direction. The head unit 43 is provided so as to be able to advance and retreat with respect to the recording transport path T1, and is provided so as to be able to move between a recording position at which the head unit 43 advances to the recording transport path T1 and performs recording on a medium, and a retreat position at which the head unit 43 retreats from the recording transport path T1.

FIG. 1 shows a state in which the head unit 43 is in the recording position, and recording is performed on a medium in this state.

Reference symbols 10A, 10B, 10C, and 10D denote ink containers serving as liquid containers. Ink ejected from the line head 44 is supplied from each ink container to the line head 44 via tubes (not shown). The ink containers 10A, 10B, 10C, and 10D are provided to be attachable to and detachable from mount sections 11A, 11B, 11C, and 11D, respectively.

Reference symbol 12 denotes a waste liquid container that stores ink as waste liquid ejected from the line head 44 toward a flushing cap (not shown) for maintenance.

The transport belt 13 is an endless belt wound around a pulley 14 and a pulley 15, and is rotated by at least one of the pulley 14 and the pulley 15 being driven by a motor (not shown). A medium is transported to a position facing the line head 44 while being attracted to a belt surface of the transport belt 13. For attraction of a medium to the transport belt 13, a known attraction method such as an air suction method an electrostatic attraction method can be adopted.

Here, the recording transport path T1 passing through a position facing the line head 44 intersects both a horizontal direction and the vertical direction, and transports a medium upward. That is, the F-axis direction intersects with both the horizontal direction and the vertical direction. Therefore, an ejection surface 44*a* that ejects ink in the line head 44 is also parallel to the F-axis direction and intersects with both the horizontal direction and the vertical direction. In the present embodiment, an angle $\alpha$ formed between the F-axis direction and the horizontal direction is 75°. The angle $\alpha$ may be changed to any other angle within the range of $0° < \alpha \leq 90°$. For example, the angle $\alpha$ may be set in the range of $45° \leq \alpha \leq 80°$. In the case of reducing the size of the device main body 2, $60° \leq \alpha \leq 80°$ is desirable.

A medium on which recording has been performed on a first surface by the line head 44 is further sent upward by the transport roller pair 32 positioned on a downstream side of the transport belt 13.

A flap 41 is provided downstream of the transport roller pair 32, and a transport direction of a medium is switched by the flap 41. In a case where a medium is discharged without further processing, a transport path of a medium is switched by the flap 41 so as to be directed toward a transport roller pair 35 on an upper side, and the medium is discharged toward a discharge tray 8, which is an example of a medium placement section, by the transport roller pair 35.

When recording is to be performed on a second surface in addition to a first surface of a medium, a transport direction of the medium is directed to a branch position K1 by the flap 41. Then, the medium passes through the branch position K1 and enters a switchback path T2. In the present embodiment, the switchback path T2 is a medium transport path on an upper side from the branch position K1. Transport roller pairs 36 and 37 are provided in the switchback path T2. The medium that has entered the switchback path T2 is transported upward by the transport roller pairs 36 and 37, and when a lower edge of the medium has passed through the branch position K1, rotational directions of the transport roller pairs 36 and 37 are switched, whereby the medium is transported downward.

A connection path T3 is connected to the switchback path T2. In the present embodiment, the connection path T3 is a medium transport path from the branch position K1 to a transport roller pair 34. An inversion path T4 is connected to the connection path T3. In the present embodiment, the inversion path T4 is a medium transport path from the transport roller pair 34 to the transport roller pair 31 through a transport roller pair 38. The inversion path T4 is a transport path upstream from a position facing the line head 44, and is a transport path positioned vertically below the line head 44.

The medium transported downward from the branch position K1 receives feeding forces from transport roller pairs 33 and 34, reaches the transport roller pair 38, is curved and inverted, and is sent to the transport roller pair 31.

With respect to a medium that is again sent to the position facing the line head 44, the second surface, which is opposite to the first surface on which recording has already been performed, faces the line head 44. As a result, recording on a second surface of a medium by the line head 44 becomes possible.

A supply roller 19 and a separation roller 20 provided in the vicinity of the transport roller pair 38 is a roller pair for feeding a medium from a supply tray (not shown in FIG. 1).

Next, a door section 60 and a hinge section 70 will be described.

Figure 2:
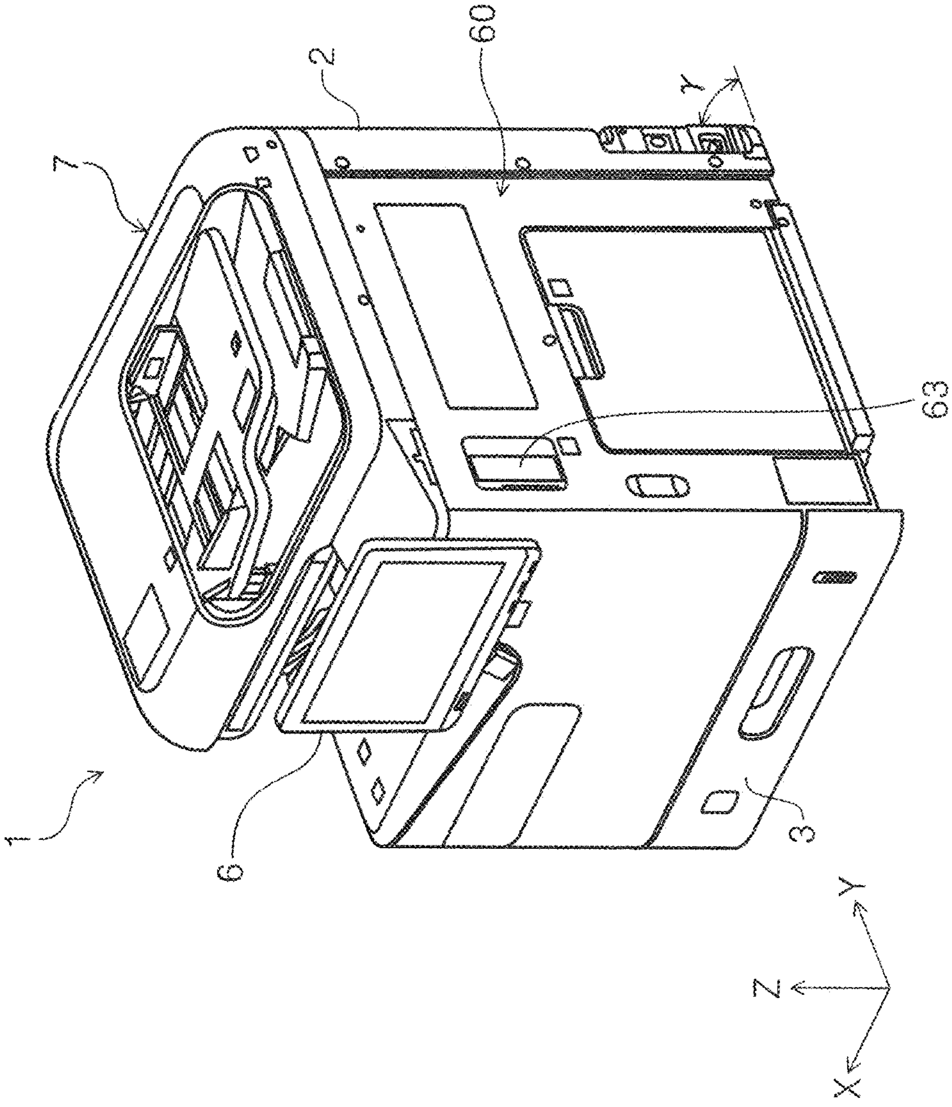
FIG. 2 is an external perspective view of the printer in a state where a door section is closed.
Figure 3:
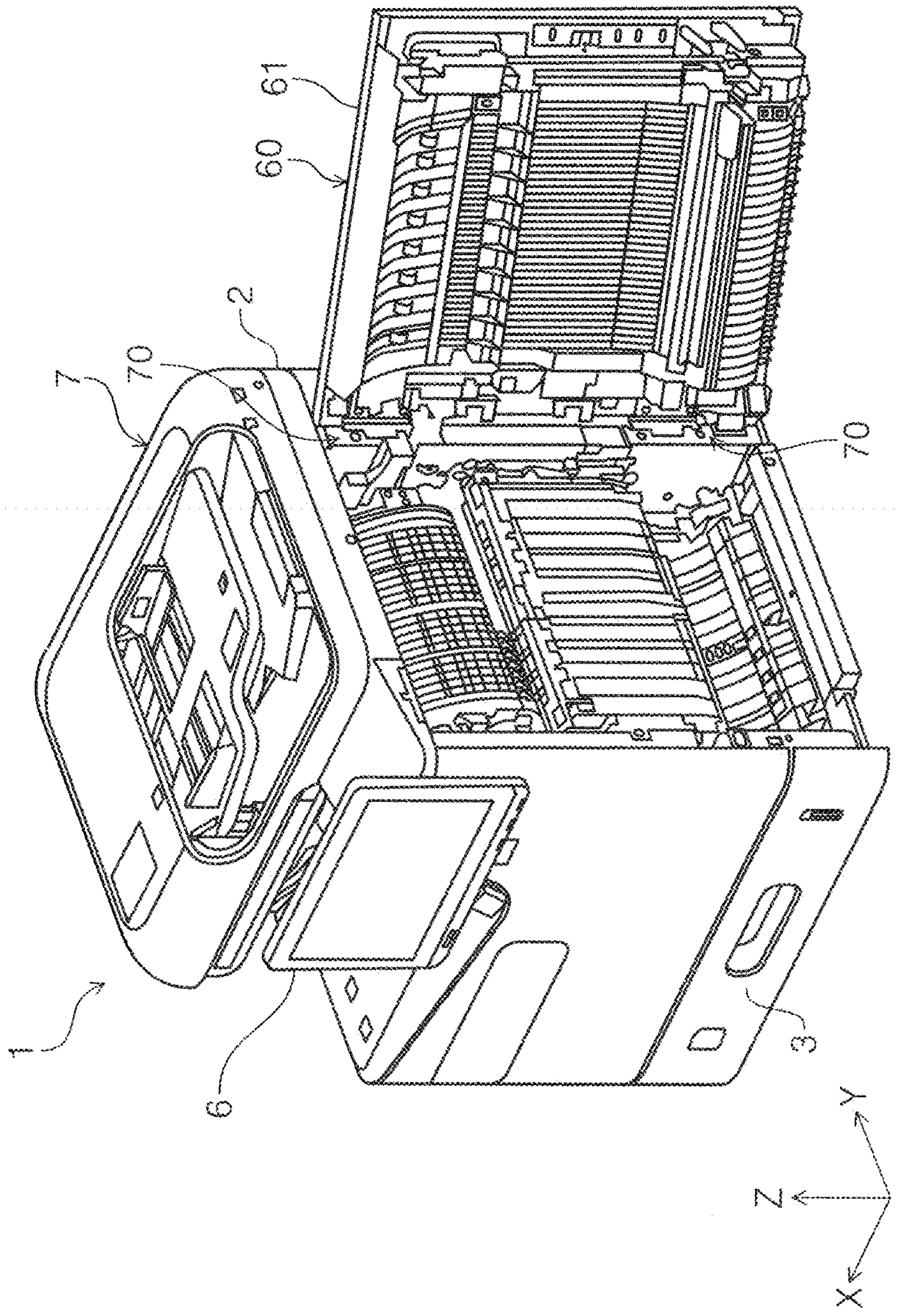
FIG. 3 is an external perspective view of the printer in a state where the door section is opened.

As shown in FIGS. 1 to 3, the door section 60, which is an openable and closable opening and closing body, is provided on a side surface of the device main body 2 in the −X direction, that is, on a right side surface.

The door section 60 forms a part of the switchback path T2, the connection path T3, and a part of the inversion path T4 with the device main body 2. The door section 60 forms the connection path T3 and a part of the inversion path T4 therein. When the door section 60 is opened as shown by a change from FIG. 2 to FIG. 3, the inside of the device main body 2 is exposed, so that a part of the switchback path T2, the connection path T3, and a part of the inversion path T4 are opened.

The door section 60 includes each of the rollers in the −X direction of the transport roller pairs 33, 36, and 37, the transport roller pair 34, the supply roller 19, the separation roller 20, and a roller in the +Z direction of the transport roller pair 38 shown in FIG. 1. When the door section 60 is opened, nips of the transport roller pairs 33, 36, 37, and 38 are released.

As described above, by opening the door section 60, it is possible to remove jammed medium in a case where a jam occurs in the switchback path T2, the connection path T3, or the inversion path T4. In FIG. 1, reference symbol Wa denotes a region occupied by the door section 60 in the Z-axis direction.

The door section 60 is pivotably connected to the device main body 2 by the hinge section 70 (to be described later), and is opened and closed with respect to the device main body 2 by being pivoted. In the present embodiment, a pivot axis of the door section 60 is parallel to the Z-axis direction. In the present embodiment, the door section 60 is pivotably connected to the device main body 2 at an end section in the +Y direction, and pivots with an end section in the −Y direction as a free end.

Figure 4:
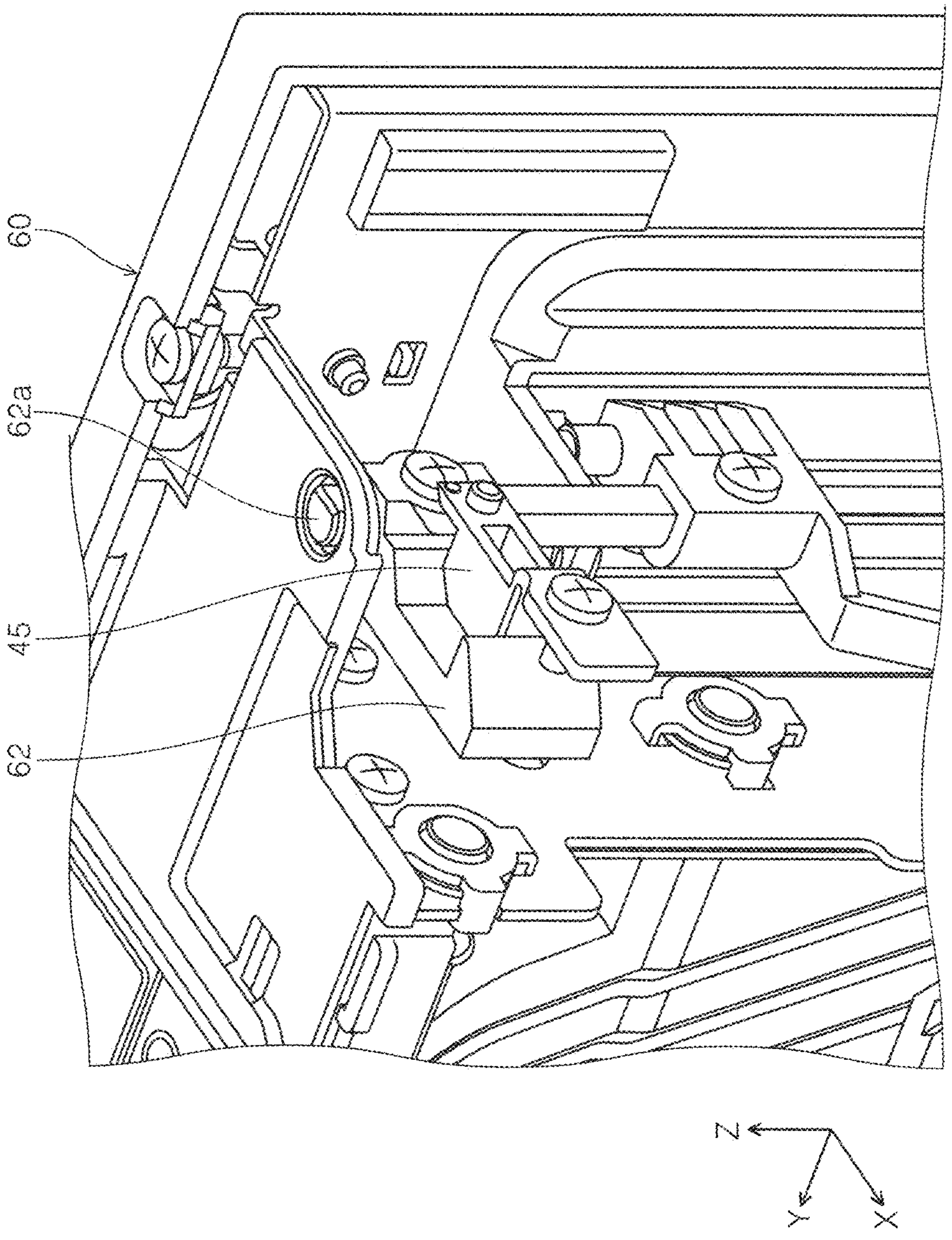
FIG. 4 is a perspective view of a lock mechanism for locking the door section in a closed state.

As shown in FIG. 4, the door section 60 is provided with a hook-shaped lock section 62, and the door section 60 is locked in a closed state with respect to the device main body 2 by engaging the lock section 62 with a locked section 45 provided on the device main body 2. The lock section 62 is provided so as to be pivotable about a pivot shaft 62*a* extending in the Z-axis direction, and switches between a locked state shown in FIG. 4 and an unlocked state in which the lock section 62 is separated from the locked section 45 by the pivot of the pivot shaft 62*a*. Although the detailed structure is not shown, the pivot shaft 62*a* can be pivoted by operating an operation lever 63 (see FIG. 2) provided on the door section 60.

As described above, since the lock section 62 for holding the door section 60 in a closed state with respect to the device main body 2 is provided, the closed state of the door section 60 can be reliably held.

Here, when performing jam processing work by opening the door section 60, if the door section 60 closes under its own weight, it is difficult to perform the jam processing work. In the present embodiment, a pivot axis of the door section 60 is parallel to the Z-axis direction, and if the placement surface G of the device main body 2 is a horizontal plane, the door section 60 will not pivot in a closing direction under its own weight when open. However, if the device main body 2 is placed in a state inclined in a direction in which an angle β shown in FIG. 1 increases, when the door section 60 is opened, a moment trying to close the door section 60 under its own weight is generated in the door section 60. The angle β is an angle formed between a side surface of the device main body 2 in the −X direction and the horizontal plane.

Similarly, when the device main body 2 is placed in a state where it is inclined in a direction where an angle γ (see FIG. 2) formed between a side surface in the +Y direction of the device main body 2 and the horizontal plane increases, a moment trying to close the door section 60 under its own weight is generated when opening the door section 60.

Therefore, the hinge section 70 for pivotably connecting the door section 60 with respect to the device main body 2 is configured to hold the door section 60 in an open state.

The hinge section 70 will be described in detail below.

Figure 5:
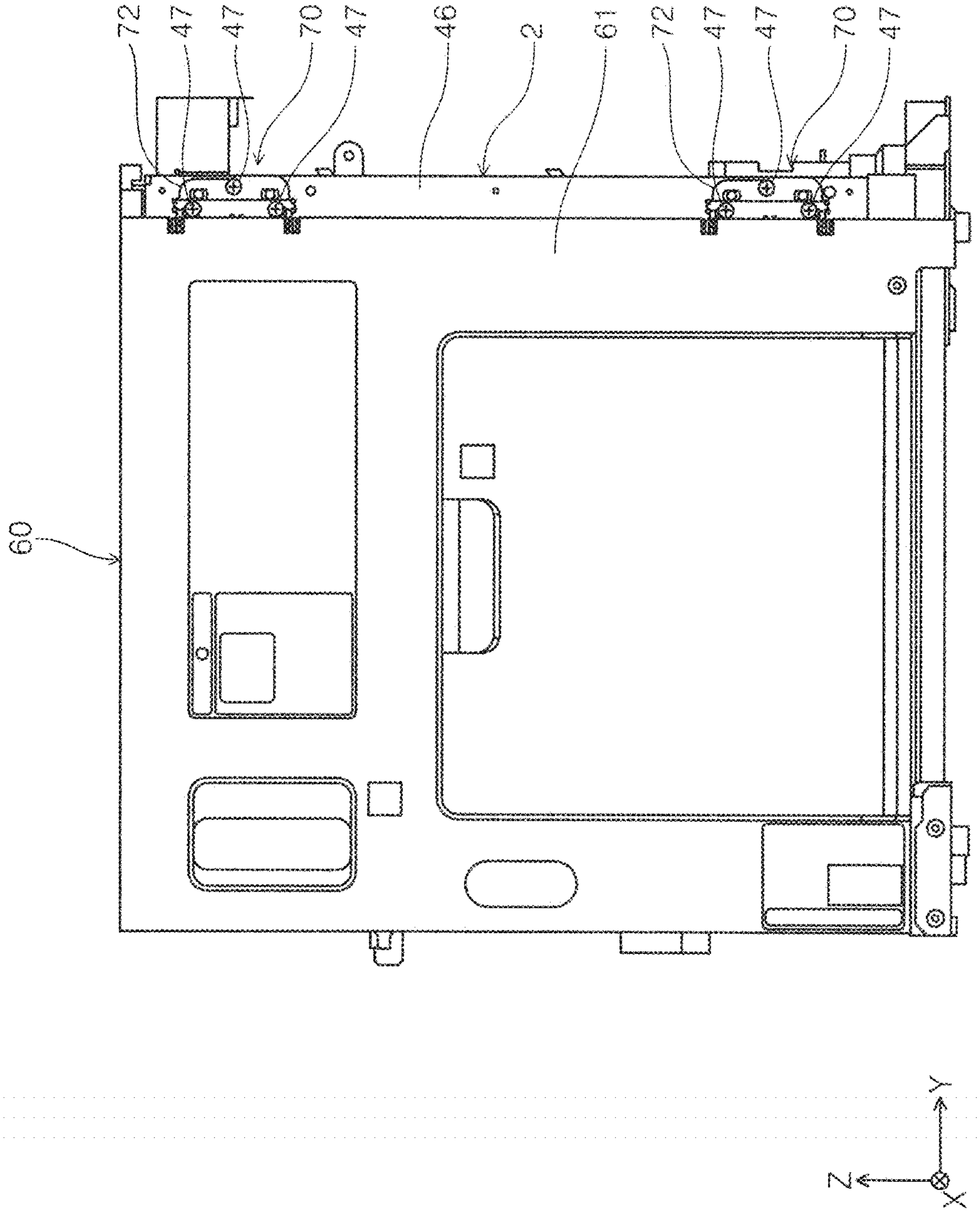
FIG. 5 is a front view of the door section in a closed state and hinge sections.

In the present embodiment, a plurality of hinge sections 70 is provided along the Z-axis direction as shown in FIGS. 3 and 5, and two hinge sections 70 are provided as an example in the present embodiment. Of course, this is an example, and one hinge section 70 may be provided, or three or more hinge sections may be provided.

In FIG. 5, reference symbol 46 denotes an attachment frame constituting the device main body 2, and the hinge sections 70 are first attached to a door main body 61 of the door section 60 and then fixed to the attachment frame 46.

Figure 8:
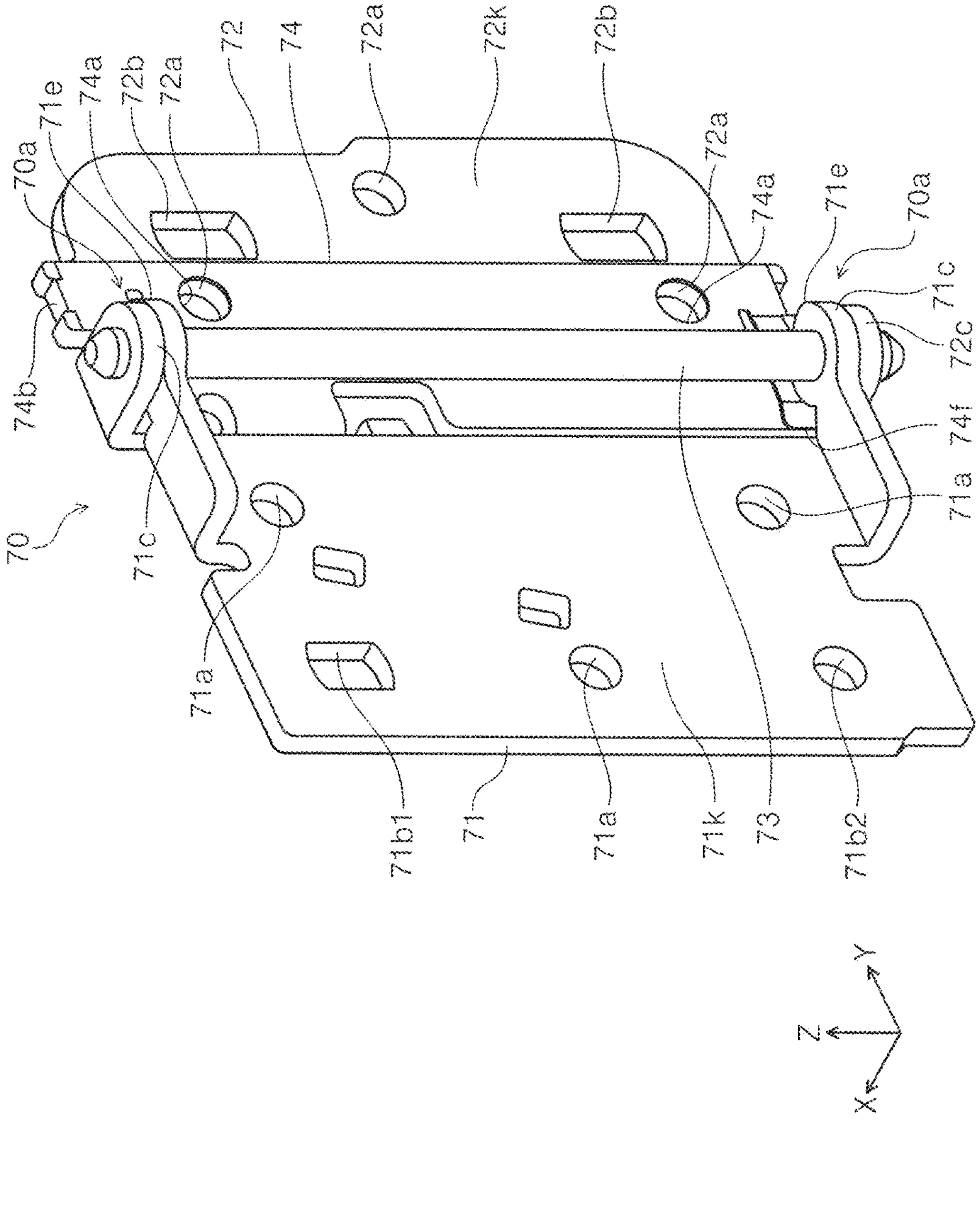
FIG. 8 is a perspective view of the hinge section.

As shown in FIG. 8, the hinge section 70 includes a main body side hinge 72 fixed to the device main body 2, a door side hinge 71 fixed to the door section 60, a pivot shaft 73, and a leaf spring 74. FIG. 8 shows a state of the hinge section 70 in a state where the door section 60 is closed.

Figure 7:
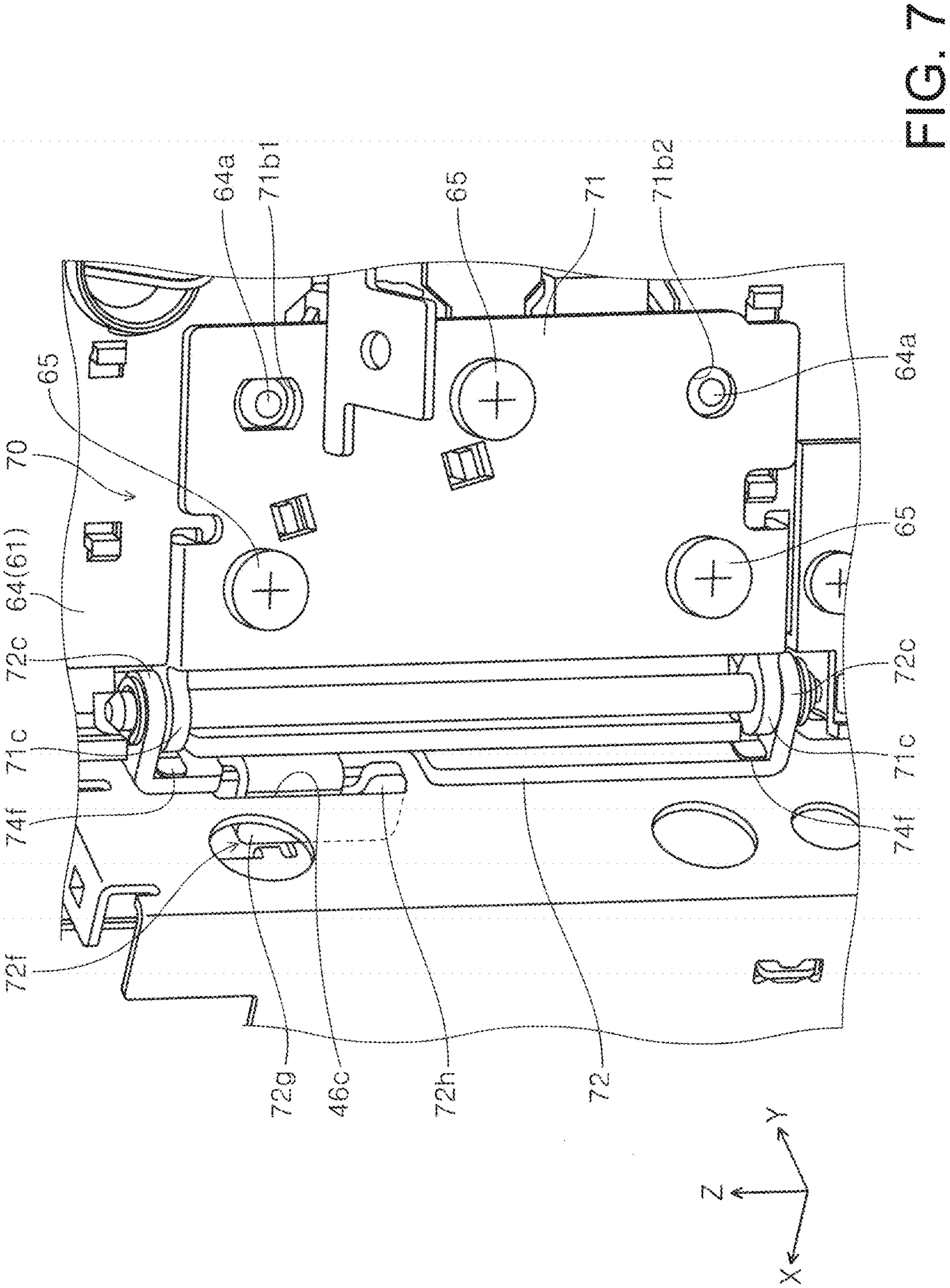
FIG. 7 is a perspective view of the hinge section when the door section is opened.

As shown in FIG. 7, the door side hinge 71 is fixed by three fixing screws 65 to a plate member 64 constituting the door main body 61. The door side hinge 71 includes positioning holes 71*b*1 and 71*b*2. Positioning protrusions

64*a* and 64*a* are formed on the plate member 64, and the door side hinge 71 is positioned with respect to the plate member 64 by fitting the positioning protrusions 64*a* and 64*a* into the positioning holes 71*b*1 and 71*b*2, respectively. Unlike the positioning hole 71*b*2, the positioning hole 71*b*1 is a hole elongated along the Z-axis direction, and even if the relative position between the positioning hole 71*b*1 and the positioning protrusion 64*a* in the Z-axis direction is slightly shifted, the shift can be absorbed. The positioning hole 71*b*2 is formed in a shape and size such that the positioning protrusion 64*a* fits without substantial rattle, thereby allowing the positioning of the door side hinge 71 in a direction along a surface of the plate member 64.

Figure 6:
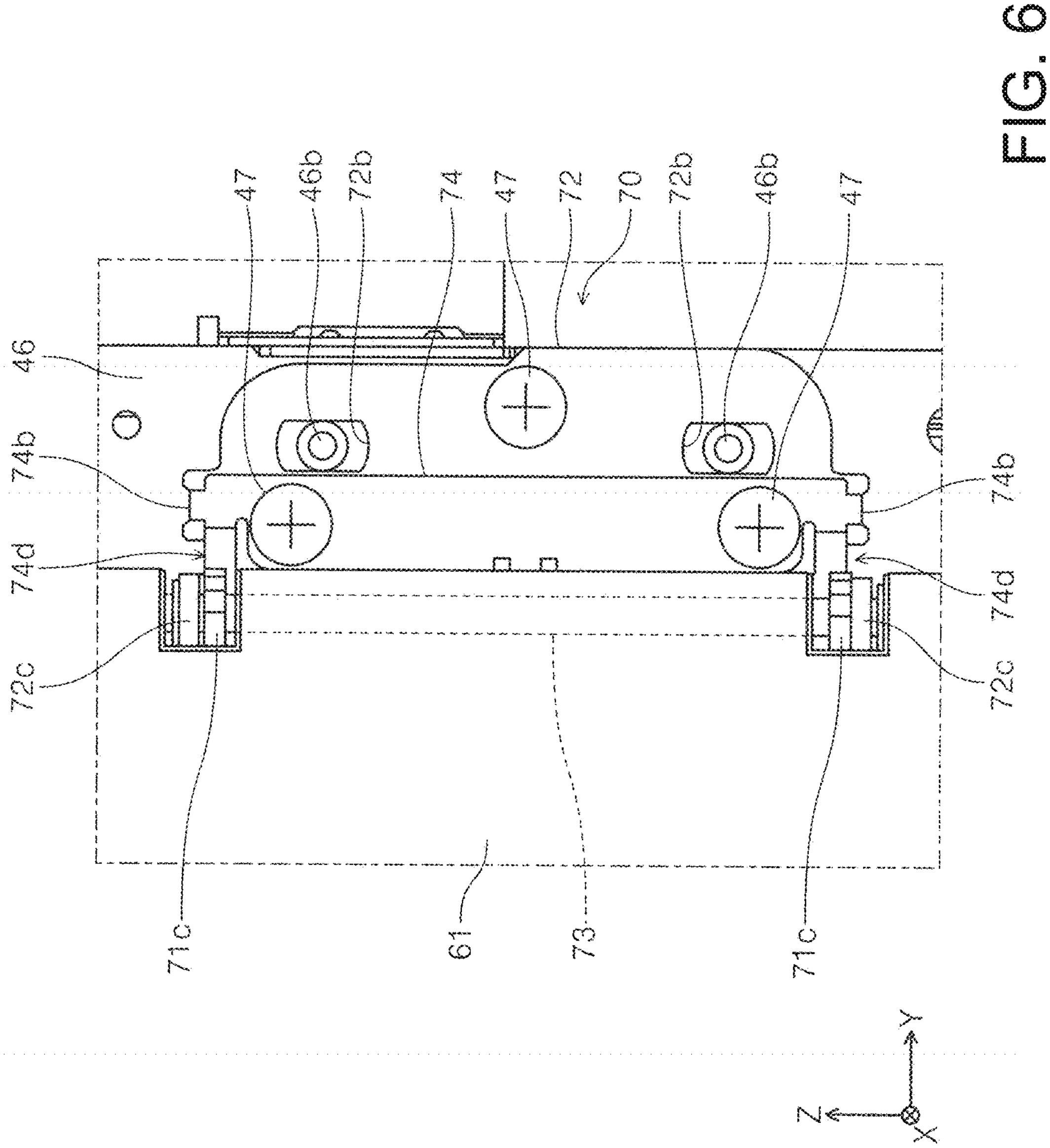
FIG. 6 is an enlarged view of the hinge section in FIG. 5.

As shown in FIG. 6, the main body side hinge 72 is fixed by three fixing screws 47 to the attachment frame 46 constituting the device main body 2. The main body side hinge 72 includes two positioning holes 72*b*. The attachment frame 46 includes positioning protrusions 46*b* and 46*b* formed on it, and by fitting the positioning protrusions 46*b* and 46*b* into the respective positioning holes 72*b* and 72*b*, the main body side hinge 72 is positioned in the Y-axis direction with respect to the attachment frame 46. The positioning hole 72*b* is an elongated hole along the Z-axis direction, and positioning along the Z-axis direction is not performed, but, positioning of the main body side hinge 72 in the Z-axis direction with respect to the attachment frame 46 is performed by a positioning section 72*h* and an elongated hole 46*c* (see FIG. 7) which will be described later.

Hereinafter, each member constituting the hinge section 70 will be described in detail.

Figure 9:
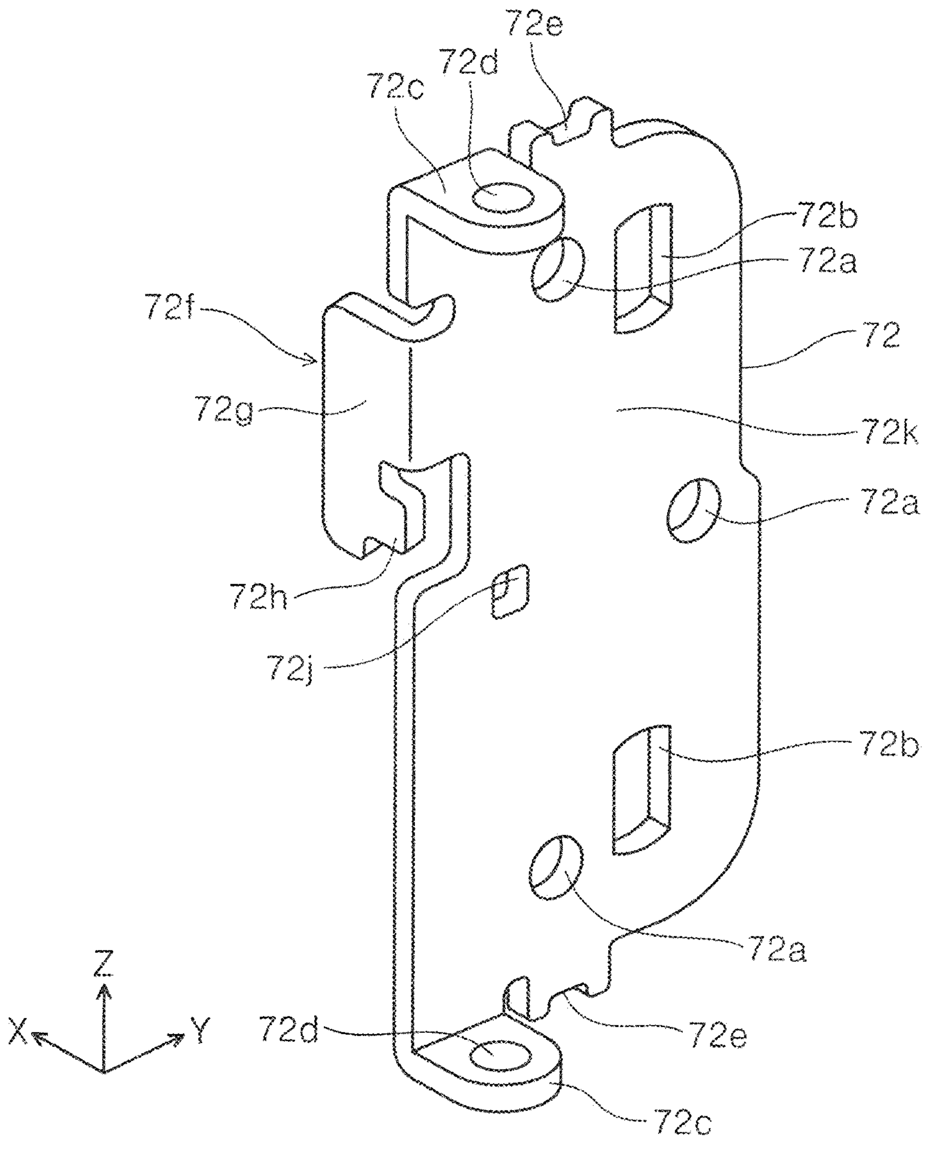
FIG. 9 is a perspective view of a main body side hinge.

The main body side hinge 72 may be formed of a metal plate material, and may be formed of steel plate cold commercial (SPCC) as an example. As shown in FIG. 9, three screw insertion holes 72*a* are formed in the main body side hinge 72, and fixing screws 47 (see FIG. 6) are passed through each of the screw insertion holes 72*a*.

In the main body side hinge 72, a main body side shaft insertion section 72*c* is formed at both end sections in the Z-axis direction so as to rise in the −X direction from a plate surface 72*k*, which is a surface of a metal plate material. Shaft insertion holes 72*d* are formed in the main body side shaft insertion sections 72*c*, and the pivot shaft 73 (see FIG. 8) is passed through the shaft insertion hole 72*d*.

The main body side hinge 72 includes recess sections 72*e* at both end sections in the Z-axis direction. The hook section 74*b* of the leaf spring 74 to be described later (see FIG. 11) can be hooked in the recess sections 72*e*, thereby provisionally fixing the leaf spring 74 to the main body side hinge 72. That is, the recess sections 72*e* function as a spring holding section for provisionally fixing the leaf spring 74 to the main body side hinge 72.

The main body side hinge 72 is provided with a positioning hole 72*j*, and a hook section 74*c* (see FIG. 11) of the leaf spring 74 is fitted into the positioning hole 72*j*. By this, the position of the leaf spring 74 with respect to the main body side hinge 72 is more accurately determined.

The main body side hinge 72 includes a bent section 72*f* formed by bending in the +X direction from an edge section in the −Y direction. The details of the bent section 72*f* will be described later.

Figure 10:
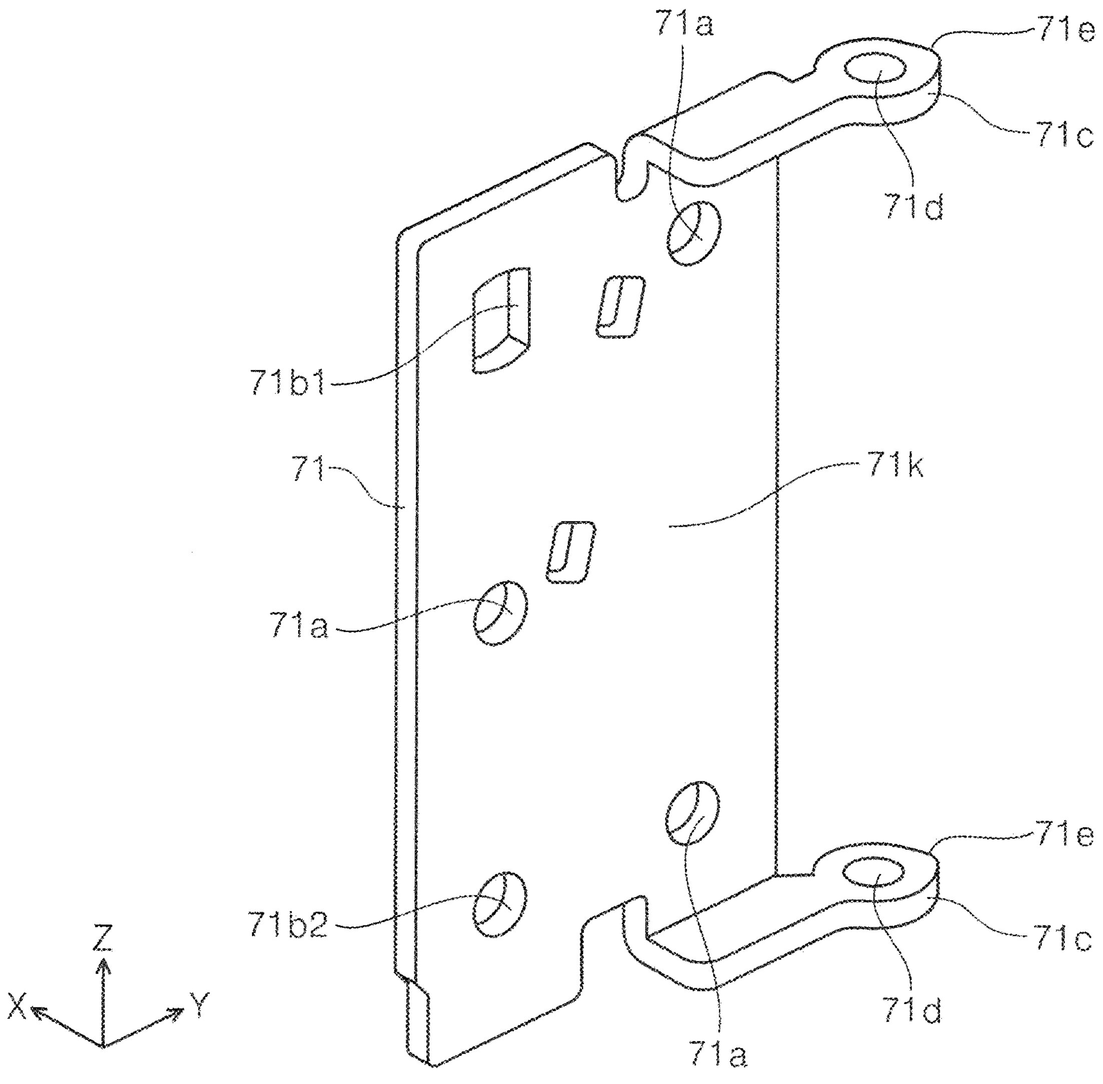
FIG. 10 is a perspective view of a door side hinge.

Next, the door side hinge 71 shown in FIG. 10 can be formed from a metal plate material, and can be formed from steel plate cold commercial (SPCC), for example. As shown in FIG. 10, three screw insertion holes 71*a* are formed in the door side hinge 71, and fixing screws 65 (see FIG. 7) are passed through the screw insertion holes 71*a*. Although the door side hinge 71 pivots together with the door section 60, the X-Y-Z coordinate system shown in FIG. 10 is in a state where the door section 60 is closed, and hereinafter, the configuration of the door side hinge 71 will be described using the X-Y-Z coordinate system shown in FIG. 10.

At both end sections of the door side hinge 71 in the Z-axis direction, a door side shaft insertion section 71*c* is formed so as to rise in the −X direction from the plate surface 71*k*, which is the surface of the metal plate material. Shaft insertion holes 71*d* are formed in the door side shaft insertion sections 71*c*, and the pivot shaft 73 (see FIG. 8) is passed through the shaft insertion holes 71*d*. The door side hinge 71 and the main body side hinge 72 are pivotably connected to each other via the pivot shaft 73.

Engagement sections 71*e* are formed at the +Y direction end sections of the door side shaft insertion sections 71*c* so as to protrude in the +Y direction. That is, an outer surface of a portion where the shaft insertion hole 71*d* is formed includes the engagement section 71*e* as a portion where the outer diameter increases, in addition to a portion where the distances from the hole center of the shaft insertion hole 71*d*, that is, the outer diameter, is equal. The portion where the outer diameter increases is shown by hatching in FIGS. 14 to 19. The engagement section 71*e* is a hatched region in FIGS. 14 to 19. Of the engagement section 71*e*, which is a portion having a large outer diameter, the portion having the largest outer diameter will be referred to as a top section of the engagement section 71*e*.

Figure 11:
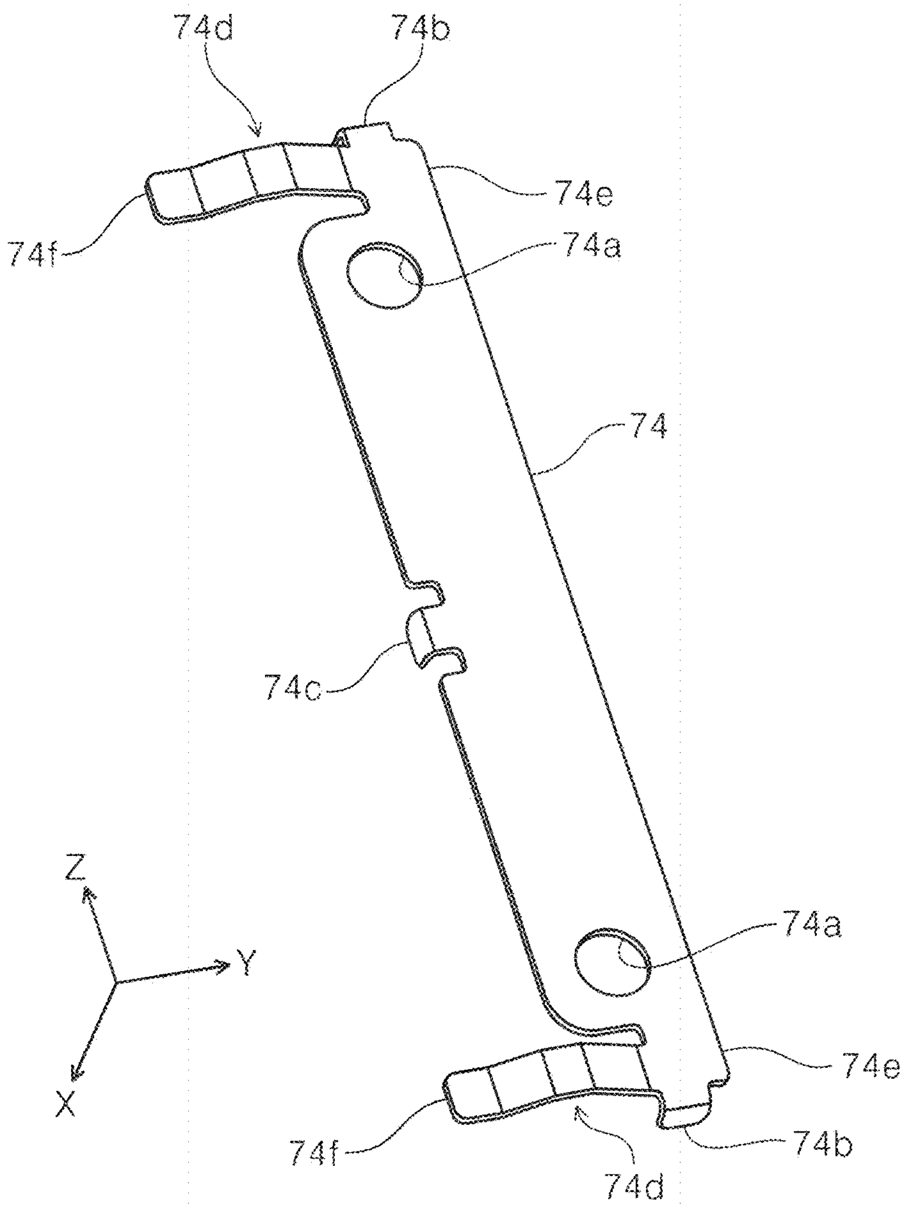
FIG. 11 is a perspective view of a leaf spring.

Next, the leaf spring 74 shown in FIG. 11 can be formed of a metal plate material, and can be formed of steel use stainless (SUS) as an example. Two screw insertion holes 74*a* are formed in the leaf spring 74, and the fixing screws 47 (see FIG. 6) are passed through the screw insertion holes 74*a*. That is, the leaf spring 74 together with the main body side hinge 72 is fixed by the fixing screws 47.

Convex sections 74*d* are formed in the leaf spring 74 at both end sections in the Z-axis direction so as to protrude in the −Y direction. Reference symbol 74*f* denotes a free end, reference symbol 74*e* denotes a fixed end, and the protruding section 74*d* is positioned between the free end 74*f* and the fixed end 74*e* in the Y-axis direction. The protruding section 74*d*, together with the engagement section 71*e* described above, constitutes a door holding section 70*a* (FIGS. 14 to 19) for holding a state in which the door section 60 is opened at a predetermined angle or more with respect to the device main body 2.

Figure 12:
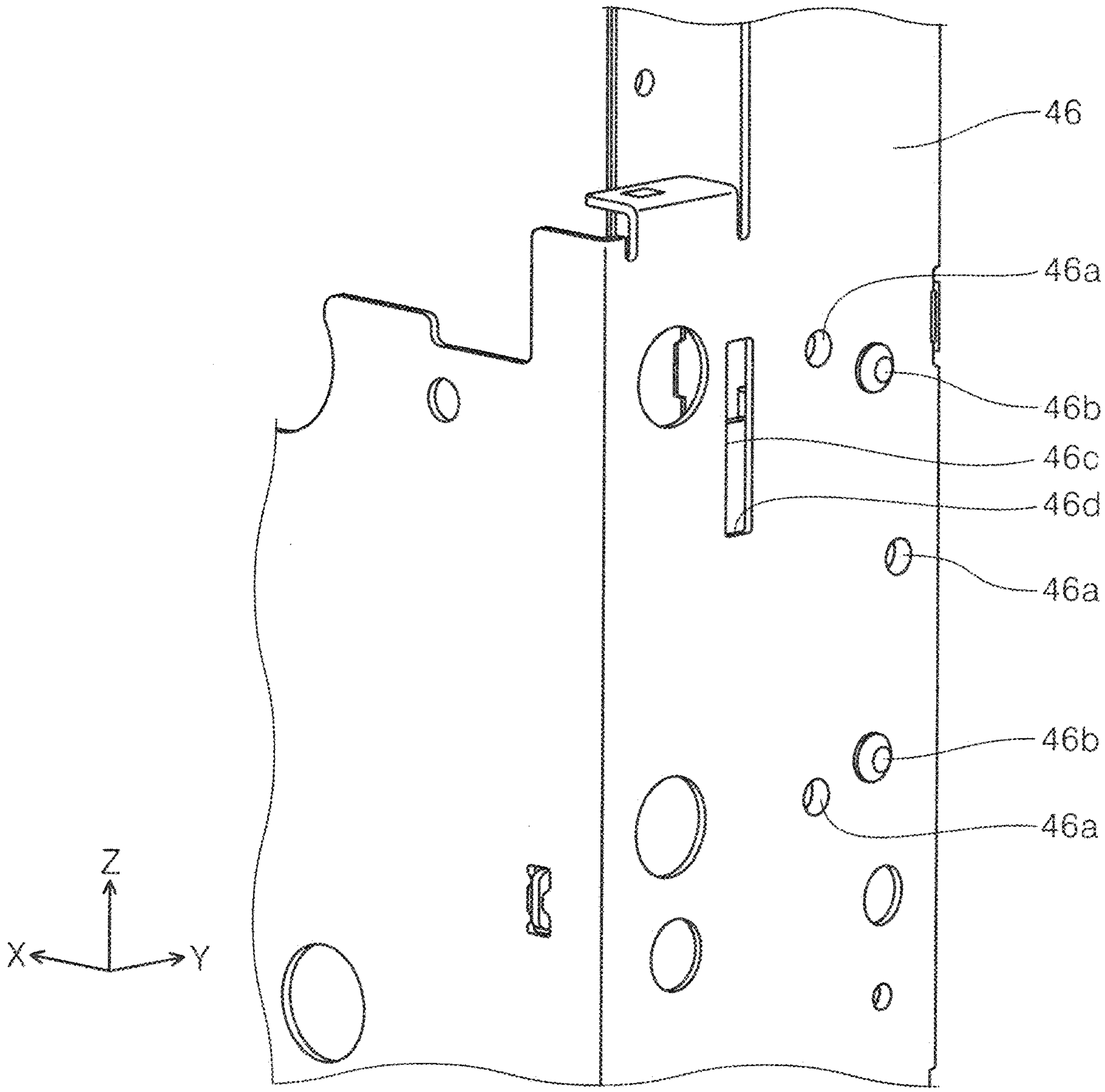
FIG. 12 is a perspective view of an attachment frame.

Next, as shown in FIG. 12, screw holes 46*a* for fixing the main body side hinge 72 by fixing screws 47 (see FIG. 6) are formed at three positions in the attachment frame 46 constituting the device main body 2. The above-described positioning protrusions 46*b* are formed on the attachment frame 46.

Next, the attachment frame 46 includes an elongated hole 46*c* formed therein, extending in the Z-axis direction.

Here, the relationship between the bent section 72*f* provided in the main body side hinge 72 and the elongated hole 46*c* formed in the attachment frame 46 will be described.

A bottom surface of the elongated hole 46*c* functions as a support surface 46*d*. The bottom surface of the elongated hole 46*c* supports the positioning section 72*h* of the bent section 72*f* as shown in FIG. 7.

Figure 13:
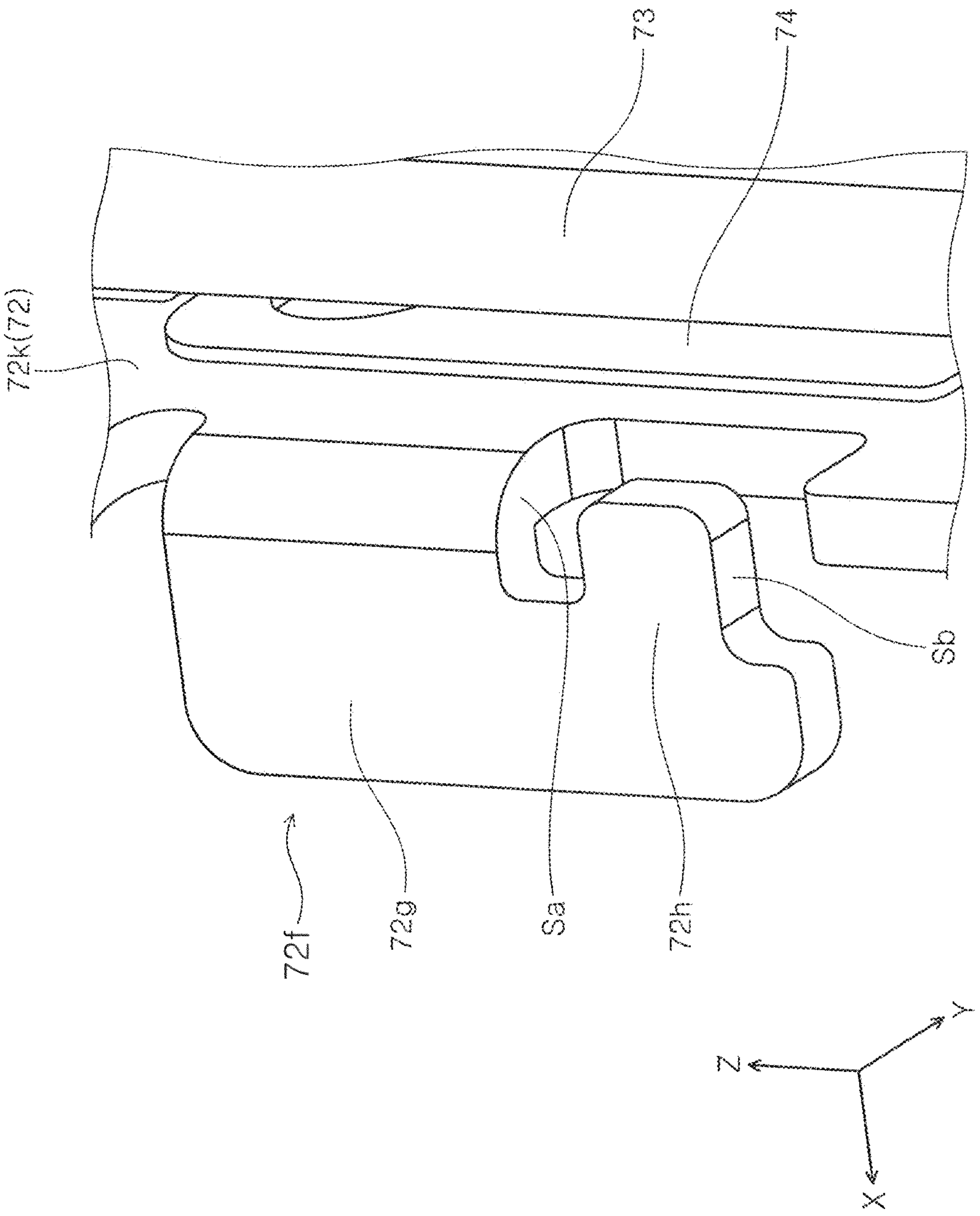
FIG. 13 is a perspective view of a bent section provided on the main body side hinge.

More specifically, as shown in FIG. 13, the bent section 72*f* is formed by being bent in a direction intersecting the plate surface 72*k* on which the leaf spring 74 is provided in the main body side hinge 72, that is, in the +X direction. The bent section 72*f* includes a connected section 72*g* connected to the plate surface 72*k*, and the positioning section 72*h* extending from the connected section 72*g* in the −Z direction. When a lower surface Sb of the positioning section 72*h* is supported by the support surface 46*d* of the elongated hole 46*c* formed in the attachment frame 46, the main body side hinge 72 is positioned in the vertical direction.

The lower surface Sb supported by the support surface 46*d* is a lower surface of a portion formed so as to protrude in the −X direction, whereby the positioning section 72*h* can sufficiently engage with the support surface 46*d* of the elongated hole 46*c* as shown in FIG. 6.

As a result of the above-described configurations, the following operations and effects can be obtained.

First, since the main body side hinge 72 is positioned in the vertical direction by the positioning section 72*h*, the position accuracy of the main body side hinge 72 in the vertical direction is improved, and since the main body side hinge 72 and the door section 60 can be provisionally fixed before screw fixing at the time of assembly work, the assembly work is facilitated.

Next, in the bent section 72*f*, a portion bent in a direction intersecting the plate surface 72*k* is less likely to maintain position accuracy due to deformation, specifically, if a portion indicated by reference symbol Sa is used as a positioning section, deviations in the position are prone to occur in the vertical direction of the main body side hinge 72. However, as described above, since the positioning section 72*h* is provided at a portion extending from the connected section 72*g*, the position of the main body side hinge 72 in the vertical direction can be determined more accurately.

Next, the door holding section 70*a*, constituted by the protruding sections 74*d* of the leaf spring 74 and the engagement sections 71*e* of the door side hinge 71, will be described in detail.

Figure 14:
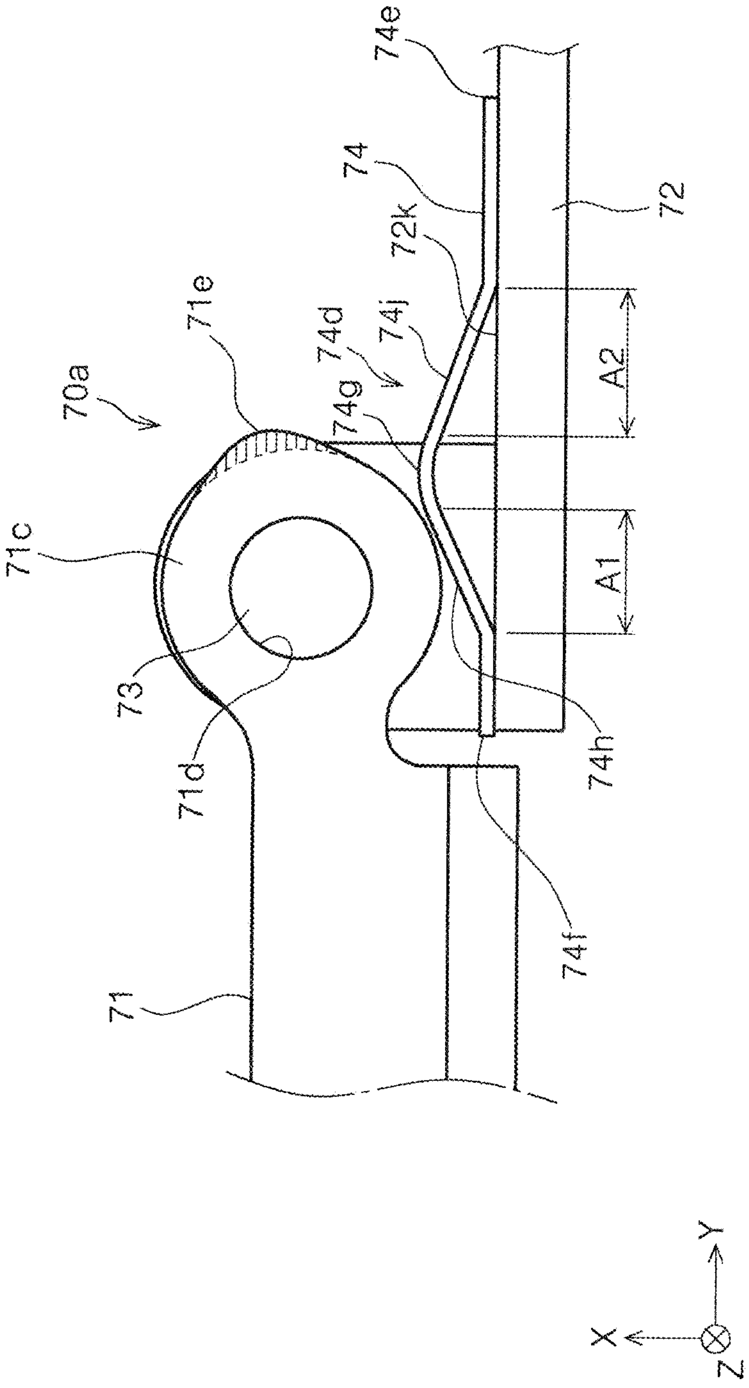
FIG. 14 is a view of a main part of the hinge section in a state where the door section is closed, as viewed from a −Z direction.

As shown in FIG. 14, the protruding section 74*d* of the leaf spring 74 has a shape protruding in the +X direction from the plate surface 72*k* of the main body side hinge 72, and the amount of protrusion is set so as to be engageable with the engagement section 71*e* of the door side hinge 71.

Portions on both sides of the protruding section 74*d* in the Y-axis direction are in a state of contact with the plate surface 72*k*, a region from the fixed end 74*e* to the protruding section 74*d*, and a region from the free end 74*f* to the protruding section 74*d* are in contact with the plate surface 72*k*.

The protruding section 74*d* includes a first inclined surface 74*h* inclined from a top section 74*g* toward the free end 74*f* and a second inclined surface 74*j* inclined from the top section 74*g* toward the fixed end 74*e*.

In the present embodiment, it is assumed that the first inclined surface 74*h* and the second inclined surface 74*j* are formed as flat surfaces without including bent surfaces. Reference symbol A1 indicates a Y-axis direction range of the first inclined surface 74*h*, reference symbol A2 indicates a Y-axis direction range of the second inclined surface 74*j*, and a bent portion including the top section 74*g* is not included in the first inclined surface 74*h* and the second inclined surface 74*j*.

However, a bent surface may be included in the first inclined surface 74*h* and the second inclined surface 74*j*.

FIG. 14 shows a state of the hinge section 70 when the door section 60 is completely closed. In this state, the engagement section 71*e* does not engage with the protruding section 74*d*. In this state, a top section of the engagement section 71*e* is positioned in the +Y direction with respect to the top section 74*g* of the protruding section 74*d*.

When the door section 60 is opened from this state, as shown in FIG. 15, the engagement section 71*e* is pressed against the protruding section 74*d*. When the door section 60 is further opened from this state, as shown in FIG. 16, the engagement section 71*e* pushes down the protruding section 74*d*, and the top section of the engagement section 71*e* passes over the top section 74*g* of the protruding section 74*d* in the −Y direction. At this time, since the free end 74*f* is not constrained in the Y-axis direction, the free end 74*f* moves in the −Y direction while sliding on the plate surface 72*k* when the engagement section 71*e* pushes down the protruding section 74*d*.

Figure 17:
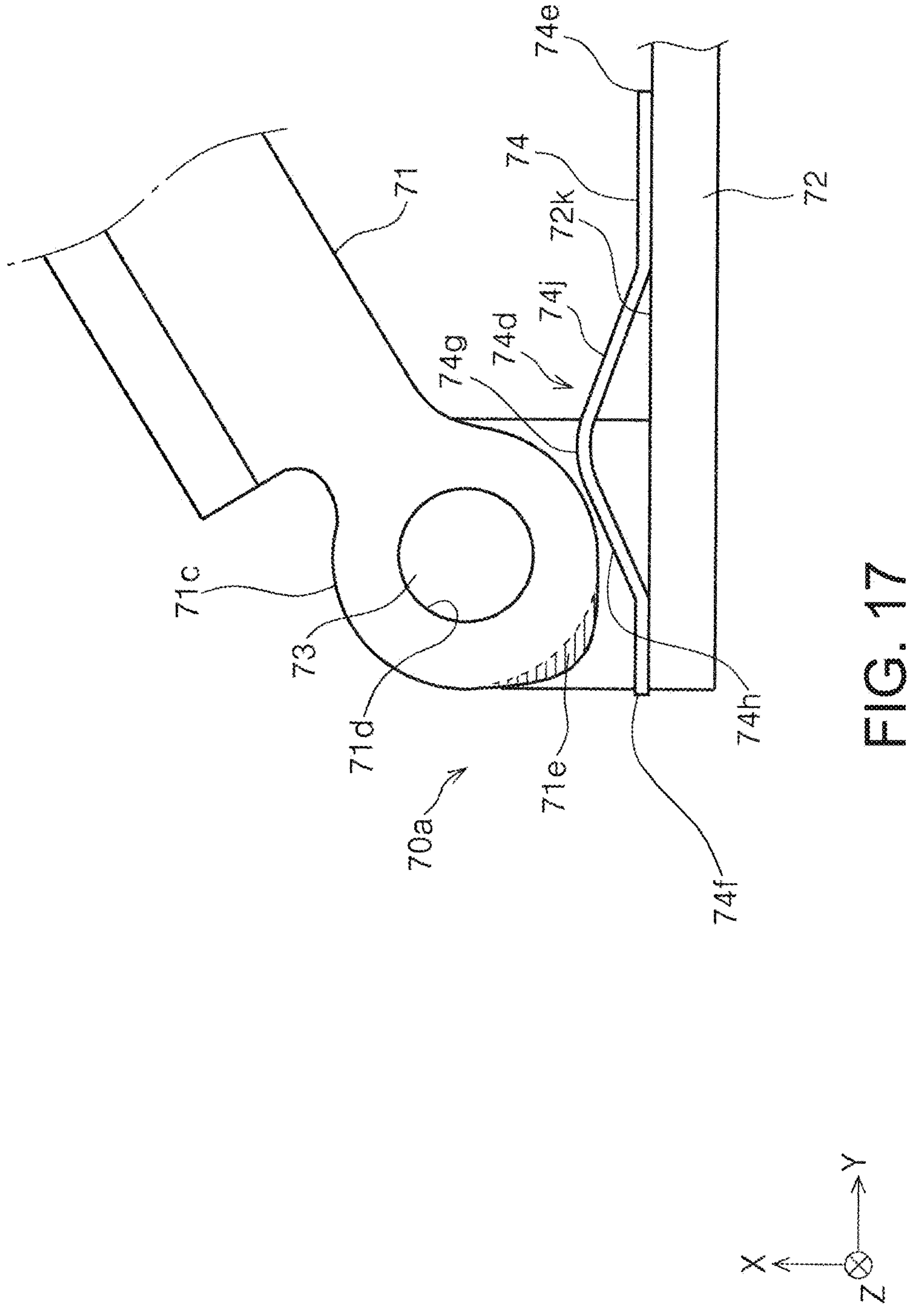
FIG. 17 is a view of a main part of the hinge section in a state where the door section is opened, as viewed from the −Z direction.

When the door section 60 is further opened, as shown in FIG. 17, the engagement section 71*e* completely passes over the protruding section 74*d* in the −Y direction. However, the maximum opening angle of the door section 60 may be an angle where the engagement section 71*e* does not completely pass over the protruding section 74*d* in the −Y direction. In other words, the maximum opening angle of the door section 60 may be an angle at which the engagement section 71*e* maintains contact with the protruding section 74*d*.

Also, if the door section 60 starts to close from this state, since the engagement section 71*e* receives a reaction force from the protruding section 74*d*, an open state of the door section 60 is maintained.

Figure 18:
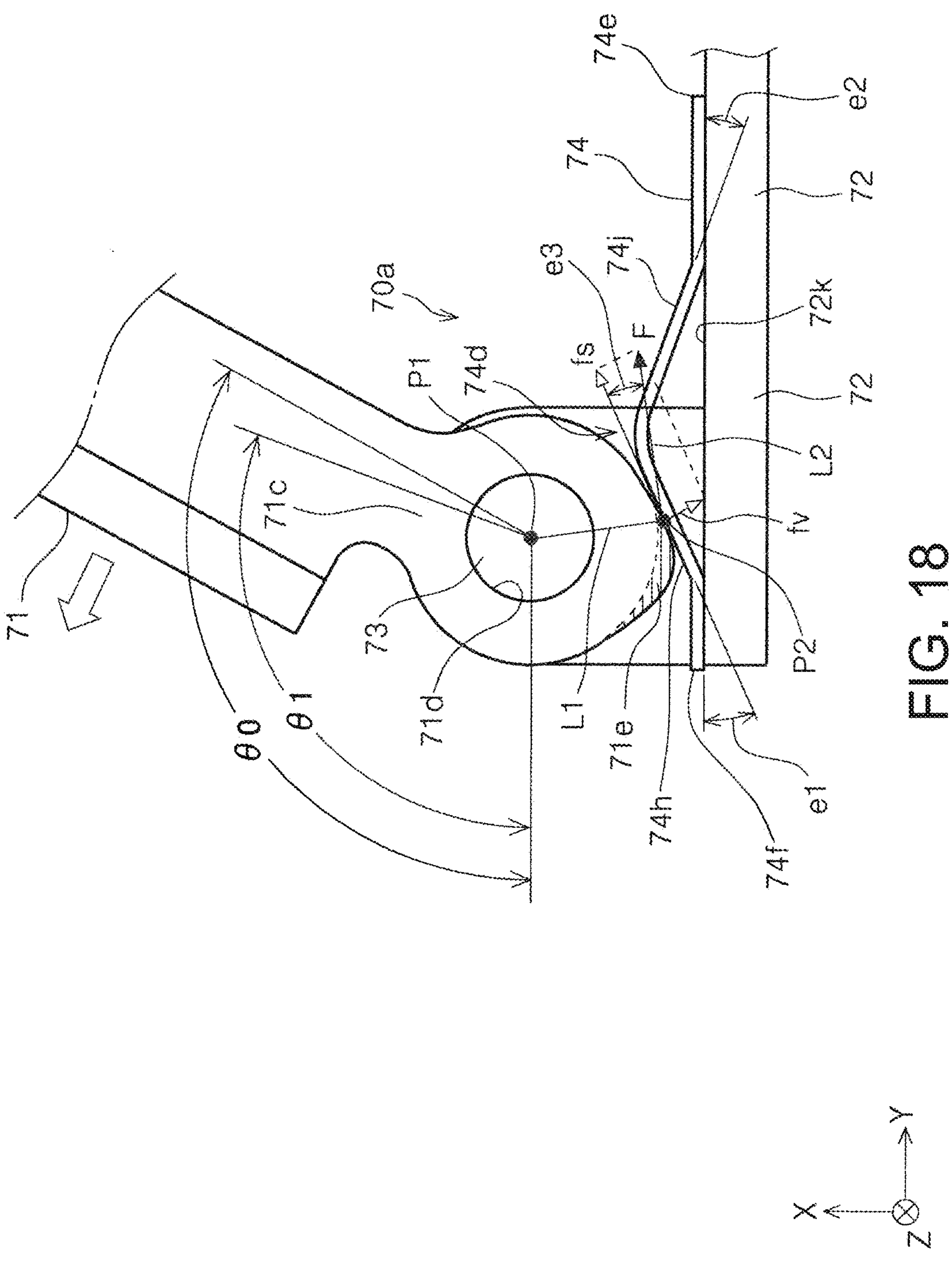
FIG. 18 is a view of a main part of the hinge section in a state where the door section is opened, as viewed from the −Z direction.

FIG. 18 shows a state of the engagement section 71*e* contacting the protruding section 74*d* when the door section 60 is pivoted in the counterclockwise direction of the figure as indicated by a white arrow, that is, when it starts to close. An angle $\theta 0$ indicates the opening angle of the door section 60 at that time.

At the time when the engagement section 71*e* contacts the protruding section 74*d*, the moment due to the weight of the door section 60 exceeds the force at which the door holding section 70*a* holds the door section 60 in an open state, and therefore, the door section 60 further pivots in the counterclockwise direction in FIG. 18. However, the force with which the door holding section 70*a* holds the door section 60 in an open state is balanced with the moment due to the weight of the door section 60, so that the door section 60 is held in an open state. An angle $\theta 1$ in FIG. 18 is an angle at that time.

The door holding section 70*a* holds a state in which the door section 60 is opened at a predetermined angle or more with respect to the device main body 2, and the angle $\theta 1$ is an example of the predetermined angle.

It is desirable that the predetermined angle is 60° or more. As a result, a state in which the door section 60 is opened at the predetermined angle or more can be held, and access to the device main body 2 during jam processing work or the like is facilitated.

If the predetermined angle is set to 80° or more, access to the device main body 2 is further facilitated. Of course, as shown in FIG. 18, access to the device main body 2 may be further facilitated by setting the predetermined angle to 90° or more. The angle $\theta 1$ in FIG. 18 indicates a case where the predetermined angle is 110°.

As described above, the door holding section 70*a* includes the plate-like leaf spring 74 and the engagement section 71*e*, wherein the leaf spring 74 includes the fixed end 74*e*, the free end 74*f* that is slidable relative to the device main body 2, and the protruding section 74*d* that is positioned between the fixed end 74*e* and the free end 74*f* and that applies a spring force to the engagement section 71*e* to hold the door section 60 in a state opened at a predetermined angle or more.

As a result, an open state of the door section 60 can be held, and therefore, access to the device main body 2 at the time of jam processing work or the like is facilitated.

Further, in a case where the door holding section 70*a* is formed of, for example, a helical torsion spring, and a force in an opening direction is constantly applied to the door section 60 by the helical torsion spring, a load applied to the door section 60 when the door section 60 is closed increases, and there is a possibility that a defect such as deformation may occur in the door section 60. However, by configuring the door holding section 70*a* with the leaf spring 74, it is possible to suppress the above problems.

In addition, since the leaf spring 74 is a plate-like member including the free end 74*f* and the fixed end 74*e*, it is possible to suppress a space required for installing a member for holding the door section 60 in an open state, and thus it is possible to suppress an increase in size of the device.

If the free end 74*f* were provided in a free state in directions advancing and retracting with respect to the engagement section 71*e*, the position of the protruding section 74*d* with respect to the engagement section 71*e* would likely be unstable. If the protruding section 74*d* separates from the engagement section 71*e*, the holding force for holding the door section 60 in an open state would be insufficient. Conversely, if the protruding section 74*d* were to approach the engagement section 71*e*, or a large operating force were required when closing the door section 60, the leaf spring 74 would be subjected to excessive force and there is a possibility that the leaf spring 74 may undergo plastic deformation.

However, in the present embodiment, the free end 74*f* of the leaf spring 74 is configured to slide relative to the device main body 2 so that the position of the protruding section 74*d* with respect to the engagement section 71*e* is likely to be stable. As a result, it is possible to appropriately obtain a holding force for holding the door section 60 in an open state. If it is possible to appropriately obtain a holding force for holding the door section 60 in an open state, it is possible to reliably maintain an open state of the door section 60. It is possible to suppress an unintentional increase in a load when opening and closing the door section 60, and it is also possible to suppress the leaf spring 74 from being plastically deformed due to excessive force applied to the leaf spring 74.

In the present embodiment, the free end 74*f* slides so that an amount of deformation of the protruding section 74*d* escapes when the door section 60 opens, but the free end 74*f* may slide so that the amount of the deformation of the protruding section 74*d* escapes when the door section 60 closes. Specifically, the fixed end 74*e* may be a free end, and the free end 74*f* may be a fixed end.

In the present embodiment, as is clear from FIG. 1, the door section 60 overlaps the line head 44, the first medium cassette 3, and the discharge tray 8 when viewed from a direction perpendicular to the door section 60, that is, the −X direction. In other words, the line head 44, at least a part of the first medium cassette 3, and at least a part of the discharge tray 8 are located within the range of a region Wa occupied by the door section 60 in the Z-axis direction.

With such a configuration, the door section 60 is increased in size, there is a possibility that the weight is increased and an open state is difficult to maintain. However, an open state of the door section 60 can be appropriately held by the door holding section 70*a* described above.

In the present embodiment, the entirety of the line head 44, a part of the first medium cassette 3, and the entirety of the discharge tray 8 are located within the range of the region Wa occupied by the door section 60 in the Z-axis direction, but the present disclosure is not limited to this, and the entirety of the line head 44, the entirety of the first medium cassette 3, and a part of the discharge tray 8 may be located within the range of the region Wa occupied by the door section 60. Alternatively, the entirety of the line head 44, the entirety of the first medium cassette 3, and the entirety of the discharge tray 8 may be located within the region Wa.

In the present embodiment, the door section 60 includes the door main body 61 and the door side hinge 71, the device main body 2 includes the attachment frame 46 and the device main body side hinge 72, the leaf spring 74 is provided in the device main body side hinge 72, and the engagement section 71*e* is provided in the door side hinge 71.

However, the leaf spring 74 may be provided on the door side hinge 71, and the engagement section 71*e* may be provided on the main body side hinge 72.

The door side hinge 71 may be integrally formed with the door section 60. For example, the door side hinge 71 may be integrally formed with the plate member 64 (FIG. 7).

Similarly, the main body side hinge 72 may be integrally formed with the device main body 2. For example, the main body side hinge 72 may be integrally formed with the attachment frame 46 (FIG. 12).

The leaf spring 74 may be provided directly to the device main body 2 or the door section 60 independently from the hinge section 70, similarly the engagement section 71*e* may be provided directly to the door section 60 or the device main body 2 independently from the hinge section 70.

By providing the leaf spring 74 on the main body side hinge 72 as in the present embodiment, and by providing the engagement section 71*e* on the door side hinge 71, the following operations and effects can be obtained.

That is, since the fixed end 74*e* and the free end 74*f* of the leaf spring 74 are supported, if a portion for supporting the leaf spring 74 is provided on a pivoting side, that is, the door section 60, the pivoting side, that is, the door section 60 tends to increase in size. However, in the present embodiment, the leaf spring 74 is provided on the main body side hinge 72, and the engagement section 71*e* is provided on the door side hinge 71, so that it is possible to suppress an increase in size of the door section 60.

In the present embodiment, the leaf spring 74 is fixed to the main body side hinge 72 by fixing screws 47 (see FIG. 6) for fixing the main body side hinge 72. This eliminates the need for an exclusive step for fixing the leaf spring 74, thereby improving workability and contributing to cost reduction.

Similarly, when fixing the leaf spring 74 with respect to the door side hinge 71, it is also possible to fix the leaf spring 74 with respect to the door side hinge 71 by using the fixing screws 65 (see FIG. 7) to fix the door side hinge 71 to the door section 60.

In the present embodiment, the main body side hinge 72 includes recess sections 72*e* (see FIG. 9) as a spring holding section for provisionally fixing the leaf spring 74 at the fixed position. This improves workability when the leaf spring 74 is fixed to the one main body side hinge 72.

In a case of fixing the leaf spring 74 to the door side hinge 71, a recess section similar to the recess section 72*e* may be provided on the door side hinge 71.

In the present embodiment, as shown in FIG. 14, the protruding section 74*d* is arranged between the pivot shaft 73 and the main body side hinge 72. Since the protruding section 74*d* is arranged in this way to utilize the space between the pivot shaft 73 and the main body side hinge 72, it is possible to reduce the size of the device.

When the leaf spring 74 is provided on the door side hinge 71, the protruding section 74*d* can be arranged between the pivot shaft 73 and the door side hinge 71.

In the present embodiment, the door side hinge 71 includes the door side shaft insertion section 71*c* through which the pivot shaft 73 is inserted, and the engagement section 71*e* is provided on the door side shaft insertion section 71*c*. As a result, it is possible to reduce the size of the device compared to a configuration in which the engagement section 71*e* is provided exclusively.

In the present embodiment, a plurality of door holding sections 70*a* is provided along an axial direction of the pivot shaft 73. More specifically, in the present embodiment, two door holding sections 70*a* are provided in one hinge section 70. Also, the present embodiment, since two hinge sections 70 are provided, four door holding sections 70*a* are provided.

As a result, an open state of the door section 60 can be more reliably maintained.

However, one door holding section 70*a* may be provided in one hinge section 70, or three or more door holding sections 70*a* may be provided.

When a plurality of hinge sections 70 is provided, it is not necessary for all the hinge sections 70 to include the door holding section 70*a*, and only some of the hinge sections 70 may include the door holding section 70*a*.

In the present embodiment, as shown in FIG. 16 or 17, in a state in which the door section 60 is opened at a predetermined angle or more, the engagement section 71*e* is positioned at a free end 74*f* side with respect to the top section 74*g* of the protruding section 74*d*. According to such a configuration, when the door section 60 is opened, the deformation of the protruding section 74*d* can escape to a free end 74*f* side. As a result, the load at the time of opening the door section 60 can be suppressed.

Next, the inclination angles of the first inclined surface 74*h* and the second inclined surface 74*j* will be described with reference to FIG. 18.

In FIG. 18, reference symbol P1 denotes the axial center of the pivot shaft 73. Reference symbol P2 is the contact point where the engagement section 71*e* contacts the protruding section 74*d* when the door section 60 pivots in a closing direction from a state, for example, the state shown in FIG. 17, in which the door section 60 is opened at an angle larger than a predetermined angle and the engagement section 71*e* does not come into contact with the protruding section 74*d*.

A line L1 is a line connecting the axial center P1 and the contact point P2, and a line L2 is a line orthogonal to the line L1. Reference symbol e3 denotes an angle formed between the line L2 and the first inclined surface 74*h*.

In the present embodiment, the angle e3 is smaller than 45°.

As a result, the following operations and effects can be obtained.

That is, when the engagement section 71*e* passes from a fixed end 74*e* side to a free end 74*f* side over the protruding section 74*d*, the free end 74*f* slides so that the engagement section 71*e* easily passes over the protruding portion 74*d*, but, when the engagement section 71*e* passes from the free end 74*f* side to the fixed end 74*e* side over the protruding section 74*d*, the protruding section 74*d* tries to deform in the opposite direction from the sliding direction of the free end 74*f*, that is, toward the fixed end 74*e* side, and a large resistance force is generated. This resistance force is indicated by arrow F in FIG. 18. Arrow fs is a component force of the resistance force F, which is parallel to the first inclined surface 74*h*, and arrow fv is a component force of the resistance force F, which is perpendicular to the first inclined surface 74*h*.

When the angle e3 is reduced, the component force fs parallel to the first inclined surface 74*h* is increased and the component force fv perpendicular to the first inclined surface 74*h* is reduced. That is, by making the angle e3 smaller than 45°, it is possible to suppress the component force fv perpendicular to the first inclined surface 74*h* of the resistance force F, making it possible to close the door section 60 with a light force. In addition, it is possible to suppress the engagement section 71*e* from being unable to pass over the protruding section 74*d* and plastically deforming the leaf spring 74.

In FIG. 18, reference symbol e1 denotes an inclination angle of the first inclined surface 74*h*, that is, an angle formed between the plate surface 72*k* and the first inclined surface 74*h*. Reference symbol e2 denotes an inclination angle of the second inclined surface 74*j*, that is, an angle formed between the plate surface 72*k* and the second inclined surface 74*j*.

The inclination angle e1 is desirably smaller than the inclination angle e2.

Thus, it is possible to suppress the resistance force F, allowing the door section 60 to be closed with a light force. In addition, it is possible to suppress the engagement section 71*e* from being unable to pass over the protruding section 74*d* and plastically deforming the leaf spring 74.

However, the inclination angle e1 may be the same as the inclination angle e2, or the inclination angle e1 may be larger than the inclination angle e2.

Figure 19:
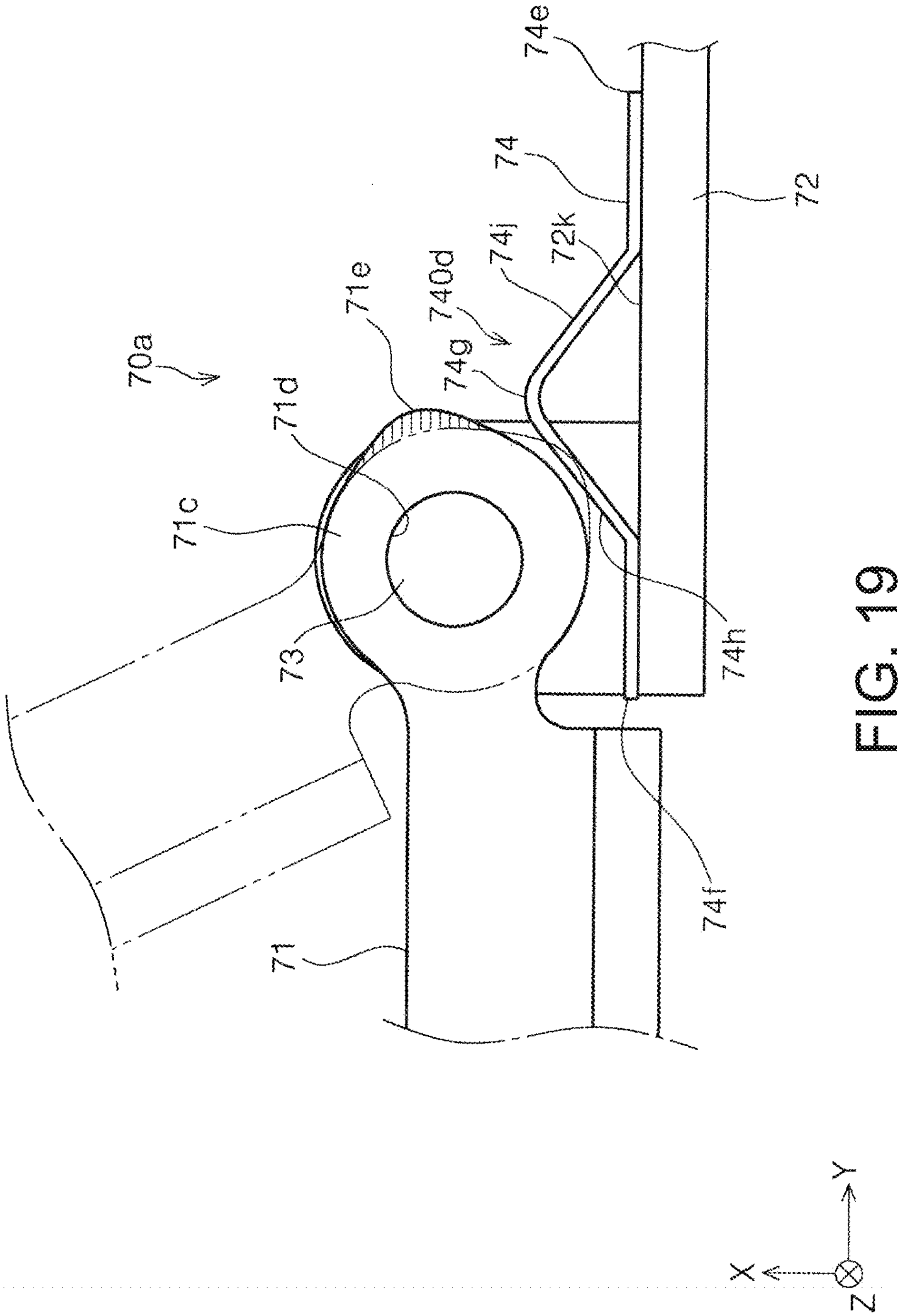
FIG. 19 is a view of a main part of a hinge section according to an other embodiment as viewed from the −Z direction.

In the embodiment described above, as described with reference to FIG. 14, in a state where the door section 60 is closed, the top section of the engagement section 71*e* is positioned in the +Y direction from the top section 74*g* of the protruding section 74*d*, and when the door section 60 is opened, the top section of the engagement section 71*e* passes over the top section 74*g* of the protruding section 74*d* in the −Y direction. However, it is not limited to such a configuration and, as shown in FIG. 19, the top section of the engagement section 71*e* may be a configuration that does not pass over the top section 74*g* of the protruding section 740*d* toward the −Y direction. In a configuration shown in FIG. 19, the engagement section 71*e* is in contact only with the first inclined surface 74*h* in the −Y direction from the top section 74*g* of the protruding section 740*d*. Even with such a configuration, it is possible to obtain the same operation and effect as in the above-described embodiment.

Further, although the entire leaf spring 74 shown in FIG. 11 was described as a leaf spring in the embodiment described above, among the leaf spring 74 shown in FIG. 11, the region involved in applying spring force, that is, the region extending in the Y-axis direction from the fixed end 74*e* to the free end 74*f*, can also be regarded as the leaf spring. In this case, the leaf spring 74 shown in FIG. 11 includes two leaf springs, and the two leaf springs can be regarded as being connected by a portion where the screw insertion holes 74*a* and the hook section 74*c* are formed.

Furthermore, the present disclosure is not limited to the embodiments and modifications described above, and various modifications are possible within the scope of the disclosure described in the claims, and it goes without saying that these are also included within the scope of the present disclosure.

What is claimed is:

1. A medium transport device that includes a transport path on which a medium is transported, the medium transport device comprising:

a device main body;

a door section configured to open and close with respect to the device main body around a pivot shaft extending in a vertical direction; and a door holding section configured to hold a state in which the door section is opened at a predetermined angle or more with respect to the device main body, wherein the door section is configured to form at least a part of the transport path, the door holding section includes a plate-like leaf spring provided on one of the door section and the device main body, and an engagement section that is provided on the other of the door section and the device main body and that is configured to engage with the leaf spring, the leaf spring includes a fixed end that is one end section and that is attached to one of the door section and the device main body, a free end that is an other end section and that is configured to slide with respect to the one of the door section and the device main body, and a protruding section positioned between the fixed end and the free end, and the protruding section applies a spring force to the engagement section to hold the door section in a state of being opened at the predetermined angle or more.

2. The medium transport device according to claim 1, wherein the door section includes a door main body and a door side hinge, the device main body includes an attachment frame and a main body side hinge, the leaf spring is provided on one of the door side hinge and the main body side hinge, and the engagement section is provided on the other of the door side hinge and the main body side hinge.

3. The medium transport device according to claim 2, wherein the leaf spring is fixed to the one of the door side hinge and the main body side hinge by a screw that fixes the one of the door side hinge and the main body side hinge.

4. The medium transport device according to claim 2, wherein the one of the door side hinge and the main body side hinge includes a spring holding section for provisionally fixing the leaf spring at a fixed position with respect to the one of the door side hinge and the main body side hinge.

5. The medium transport device according to claim 2, wherein the protruding section is arranged between the pivot shaft and the one of the door side hinge and the main body side hinge.

6. The medium transport device according to claim 2, wherein the leaf spring is provided on the main body side hinge and the engagement section is provided on the door side hinge.

7. The medium transport device according to claim 6, wherein the door side hinge includes a door side shaft insertion section through which the pivot shaft is inserted and the engagement section is provided on the door side shaft insertion section.

8. The medium transport device according to claim 1, wherein a plurality of the door holding sections is provided along an axial direction of the pivot shaft.

9. The medium transport device according to claim 2, wherein the main body side hinge includes a bent section formed by bending in a direction intersecting with a surface on which the leaf spring is provided, the bent section includes a connected section connected to the surface on which the leaf spring is provided and a positioning section extending from the connected section, and the positioning section positions the main body side hinge in the vertical direction.

10. The medium transport device according to claim 1, wherein in a state where the door section is opened at the predetermined angle or more, the engagement section is positioned on a free end side with respect to a top section of the protruding section.

11. The medium transport device according to claim 1, wherein the protruding section includes a first inclined surface inclined toward the free end and an angle formed between the first inclined surface and a line orthogonal to a line connecting a center of the pivot shaft and a contact point is smaller than 45°, the contact point being defined as a point at which the engagement section contacts the protruding section by the door section being pivoted, in a closing direction, from a state where the door section is opened at an angle larger than the predetermined angle and the engagement section is not in contact with the protruding section.

12. The medium transport device according to claim 1, wherein the protruding section includes a first inclined surface inclined toward the free end and a second inclined surface inclined toward the fixed end and an inclination angle of the first inclined surface is smaller than an inclination angle of the second inclined surface.

13. The medium transport device according to claim 1, wherein the predetermined angle is 60° or more.

14. The medium transport device according to claim 1, further comprising:

a lock section configured to hold the door section in a closed state with respect to the device main body.

15. A recording device comprising:

the medium transport device according to claim 1 and a recording section that is accommodated in the device main body and that performs recording on a medium transported in the transport path.

16. The recording device according to claim 15, further comprising:

a medium accommodation section that is positioned below the recording section and that is configured to accommodate a medium on which recording is performed by the recording section and a medium placement section that is positioned above the recording section and on which a medium on which recording has been performed by the recording section is discharged and supported, wherein the door section, when viewed in a direction perpendicular to the door section, overlaps with the recording section, the medium accommodation section, and the medium placement section.

* * * * *